United States Patent [19]

Pomerene et al.

[11] 4,437,149
[45] Mar. 13, 1984

[54] CACHE MEMORY ARCHITECTURE WITH DECODING

[75] Inventors: James H. Pomerene, Chappaqua; Rudolph N. Rechtschaffen, Scarsdale, both of N.Y.

[73] Assignee: International Business Machines Corporation, Armonk, N.Y.

[21] Appl. No.: 207,481

[22] Filed: Nov. 17, 1980

[51] Int. Cl.³ .......................... G06F 9/30; G06F 13/00
[52] U.S. Cl. .................................................... 364/200
[58] Field of Search ... 364/200 MS File, 900 MS File

[56] References Cited

U.S. PATENT DOCUMENTS

| 3,898,624 | 8/1975 | Tobias | 364/200 |
| 3,928,857 | 12/1975 | Carter et al. | 364/200 |
| 4,080,648 | 3/1978 | Asano et al. | 364/200 |
| 4,200,927 | 4/1980 | Hughes et al. | 364/200 |
| 4,371,927 | 2/1983 | Wilhite et al. | 364/200 |
| 4,382,278 | 5/1983 | Appelt | 364/200 |

Primary Examiner—James D. Thomas
Assistant Examiner—Archie E. Williams
Attorney, Agent, or Firm—Roy R. Schlemmer

[57] ABSTRACT

An information processing unit and storage system comprising at least one low speed, high capacity main memory having relatively long access time and including a plurality of data pages stored therein and at least one high speed, low capacity Cache memory means having a relatively short access time and adapted to store a predetermined plurality of subsets of the information stored in said main memory data pages. Instruction decoding means are located in the communication channel between the main Memory and the Cashe which are operative to at least partially decode instructions being transferred from main Memory to Cache. The at least partial decoding comprising expanding the instruction format from that utilized in the main Memory storage to one more readily executable by the processor prior to storing said instructions in the Cache. Said decoding means includes a logic circuit means for determining whether a given instruction is susceptible of partial decoding and means for determining that a particular instruction has already been partially decoded (i.e., after a first accessing of said instruction by the processor from Cache).

In the preferred embodiment the assumption is made that the system utilizes separate Cache storage means for data and instructions respectively whereby only instructions being transferred from main Memory to Cache will pass through said decoding means.

11 Claims, 29 Drawing Figures

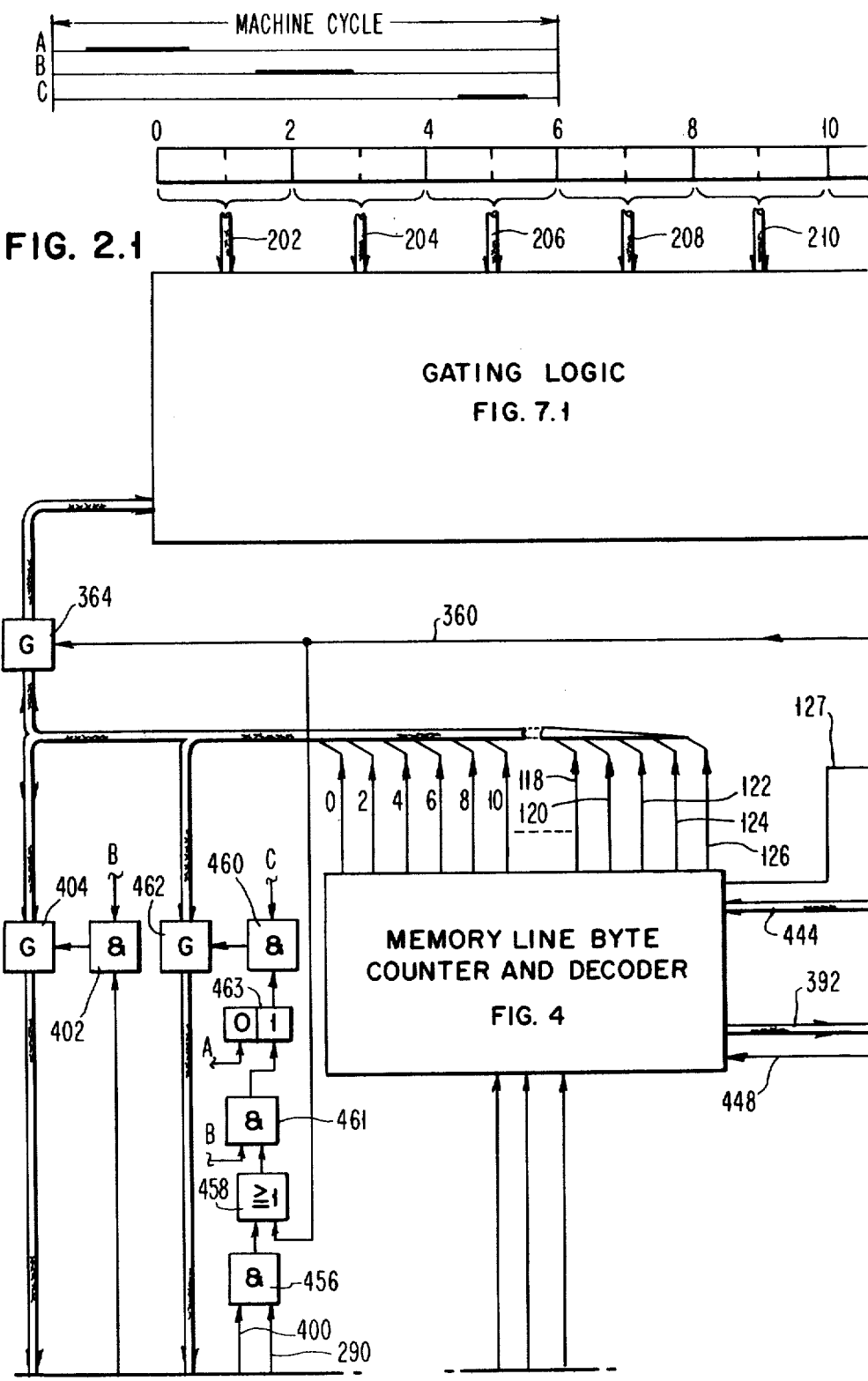

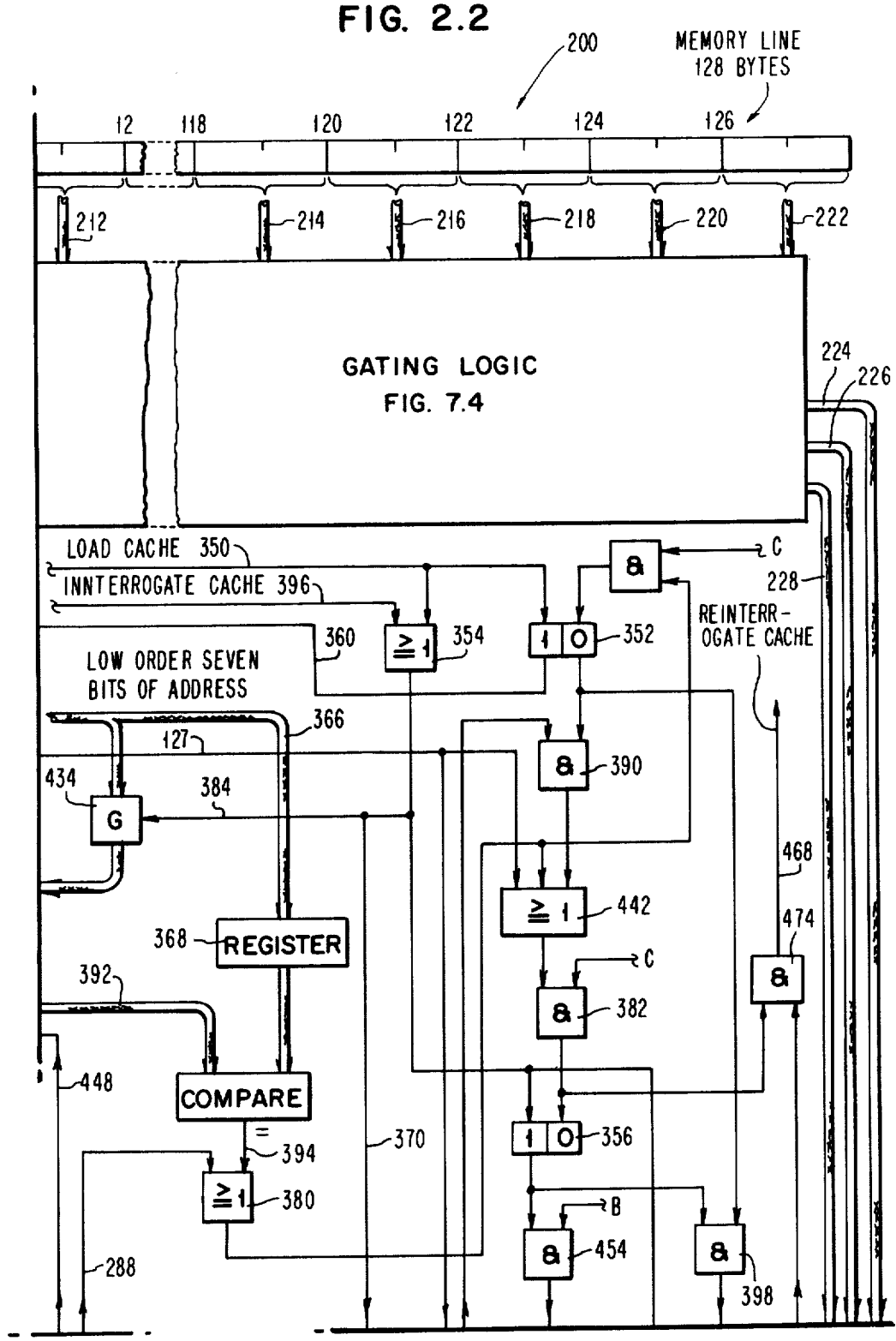
FIG. 2.2

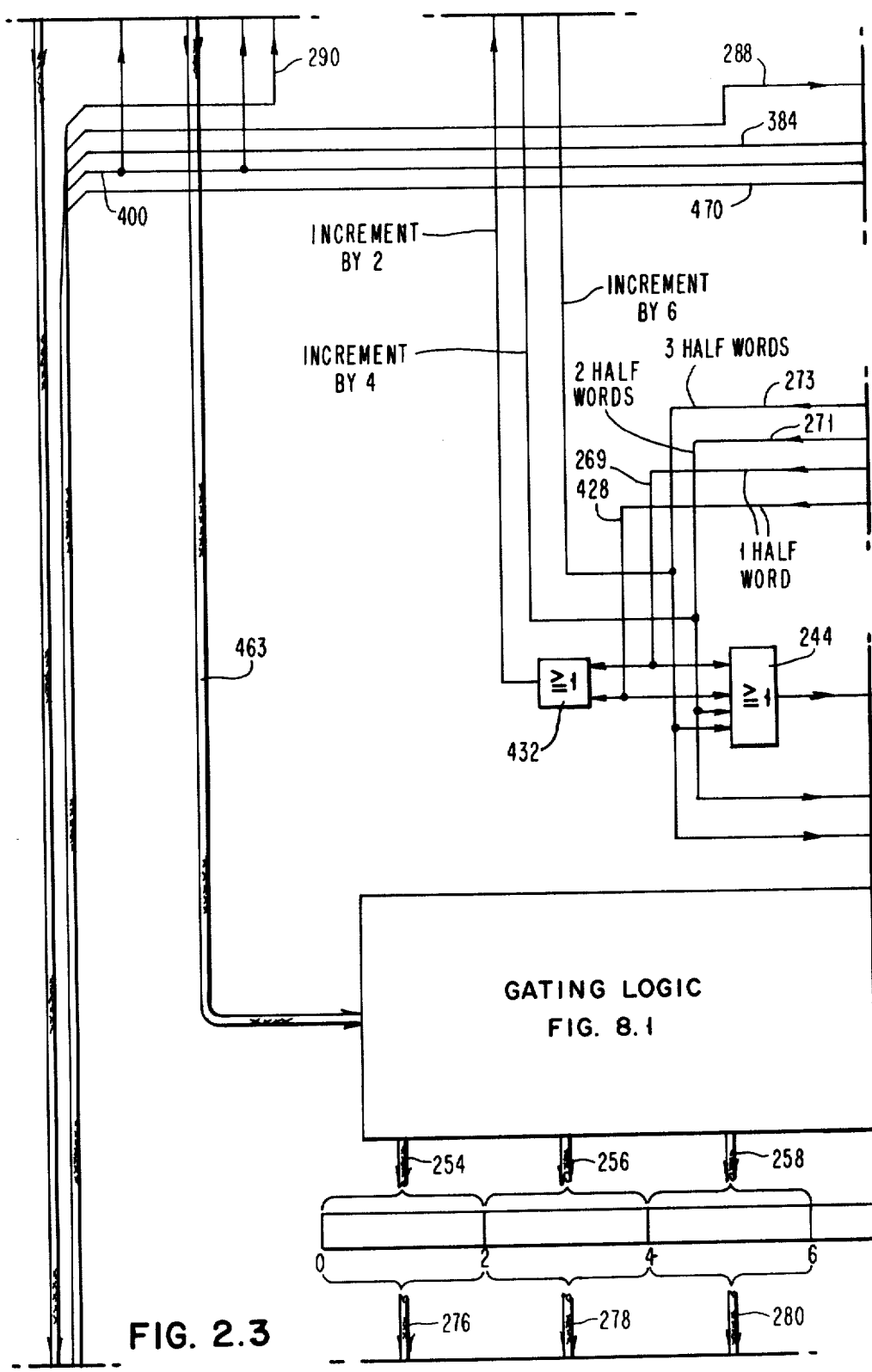
FIG. 2.3

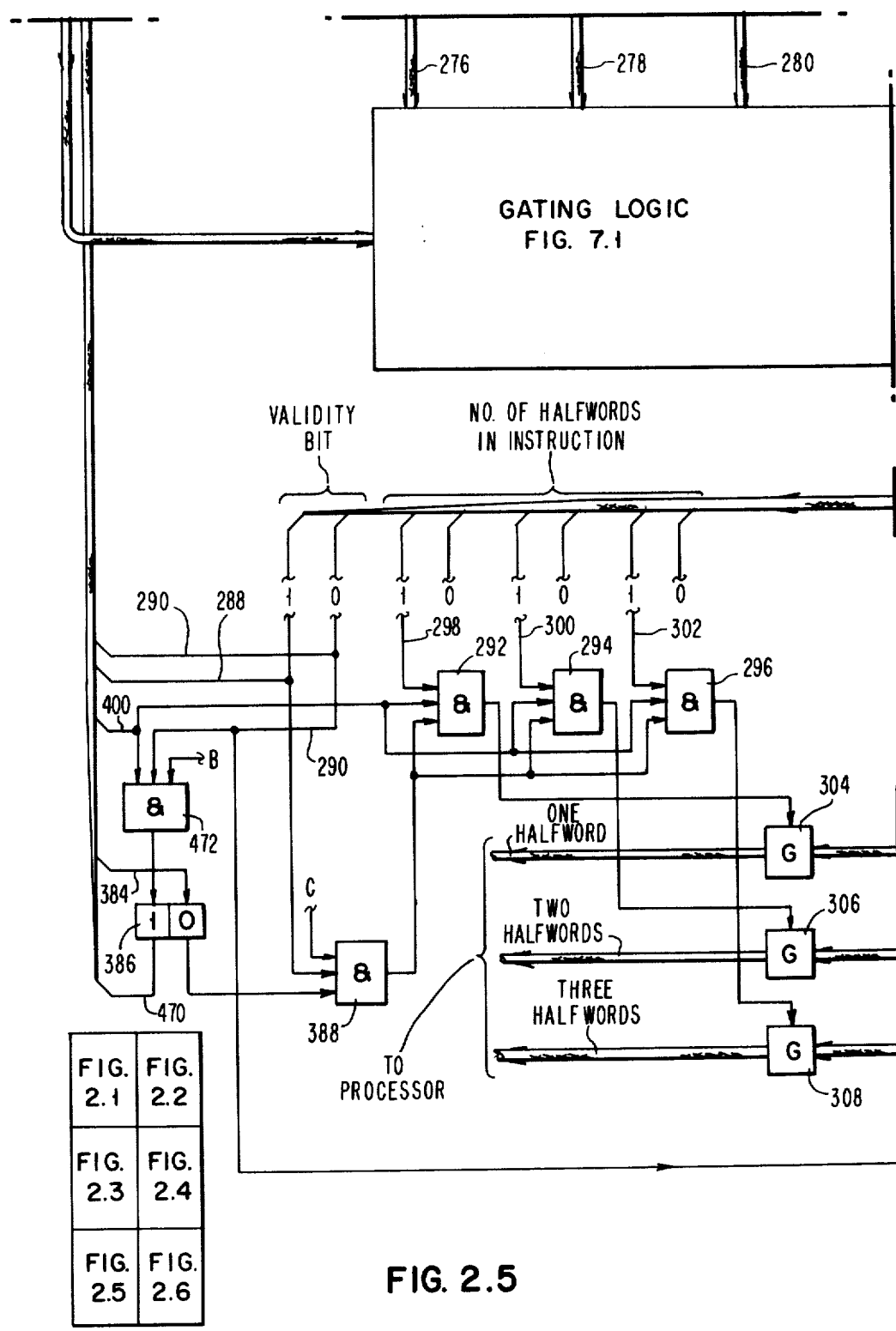
FIG. 2.5

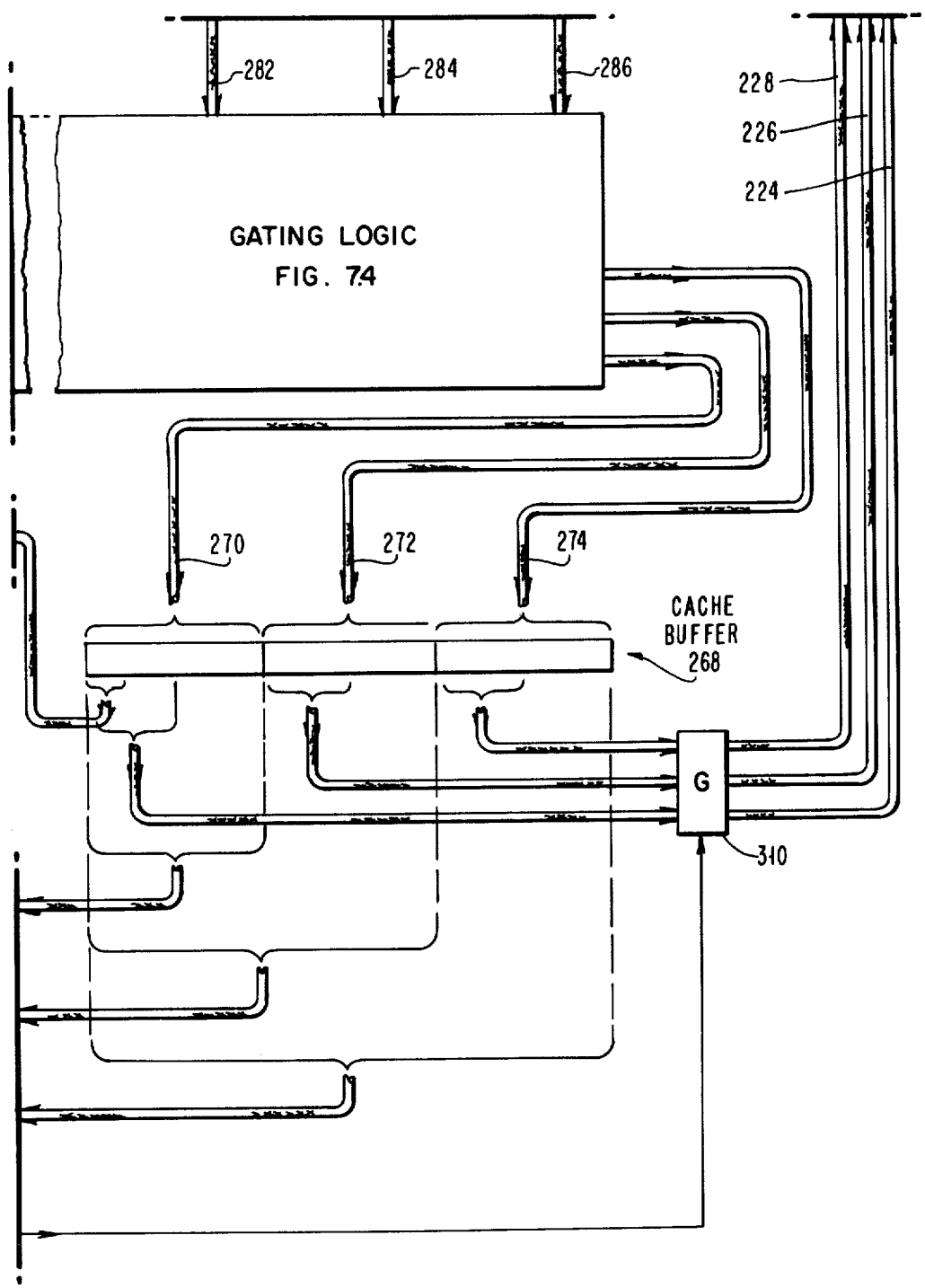
FIG. 2.6

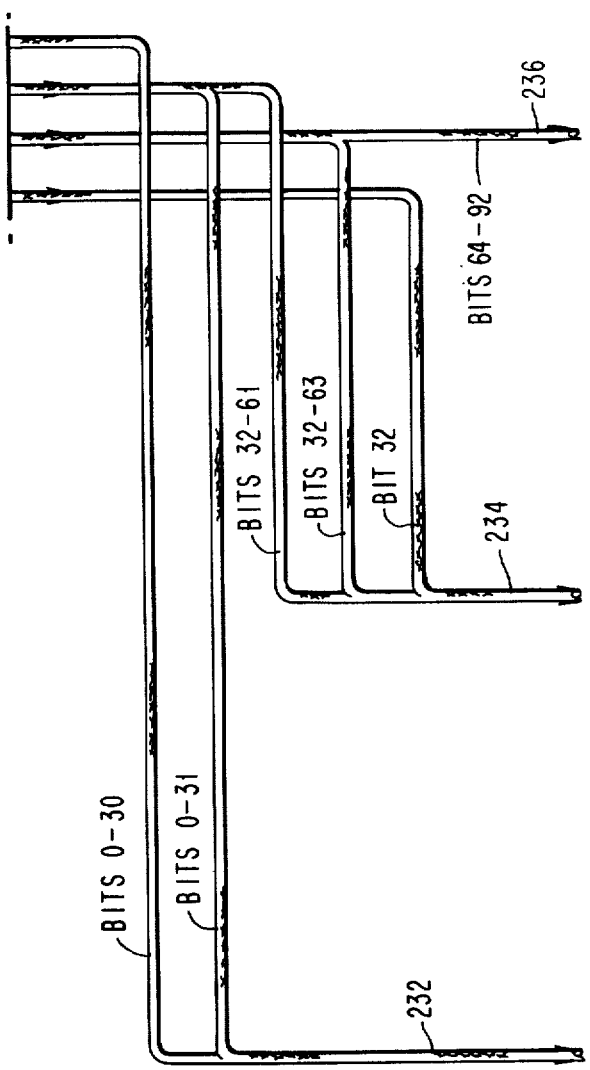

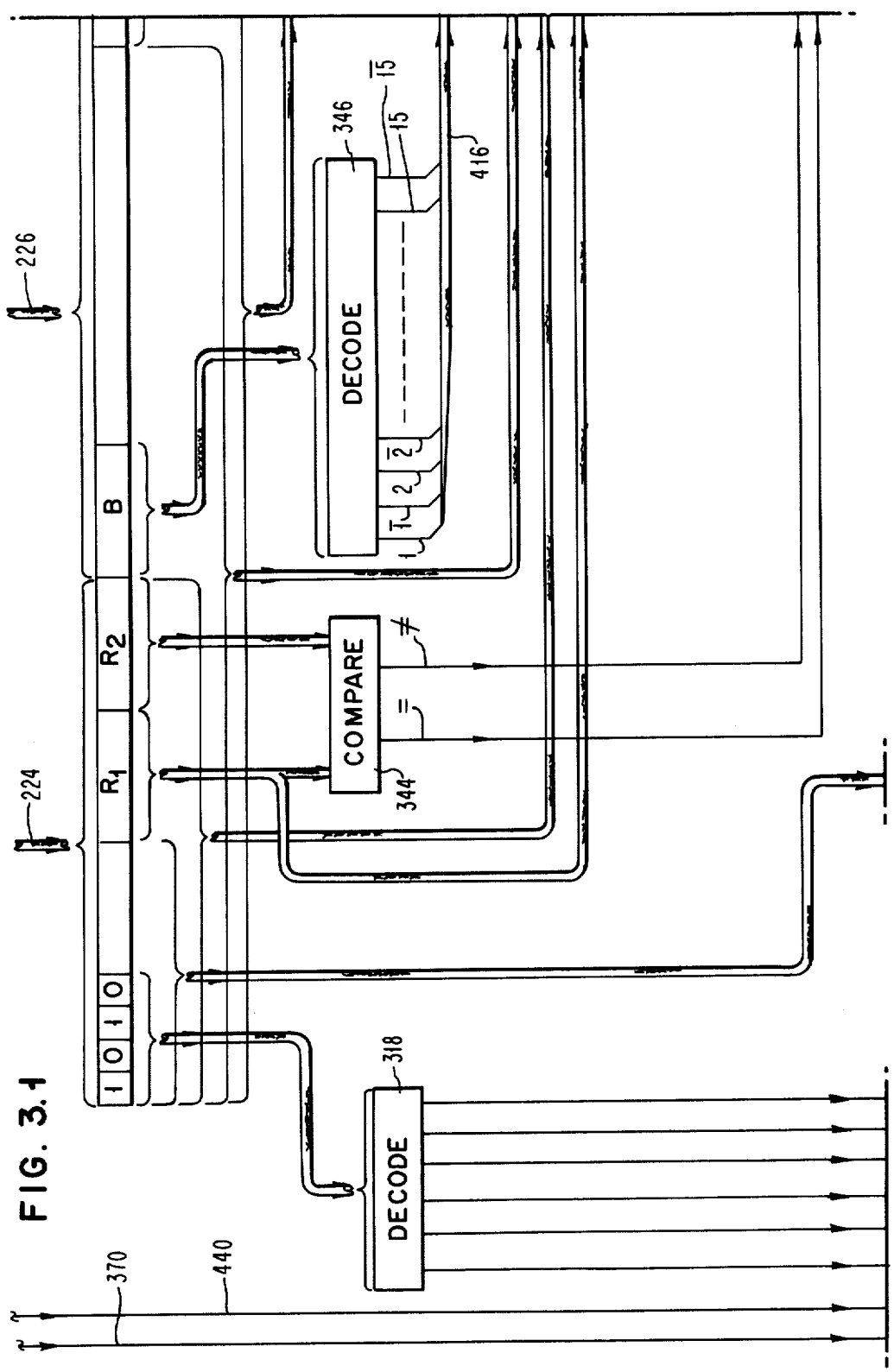
FIG. 3.1

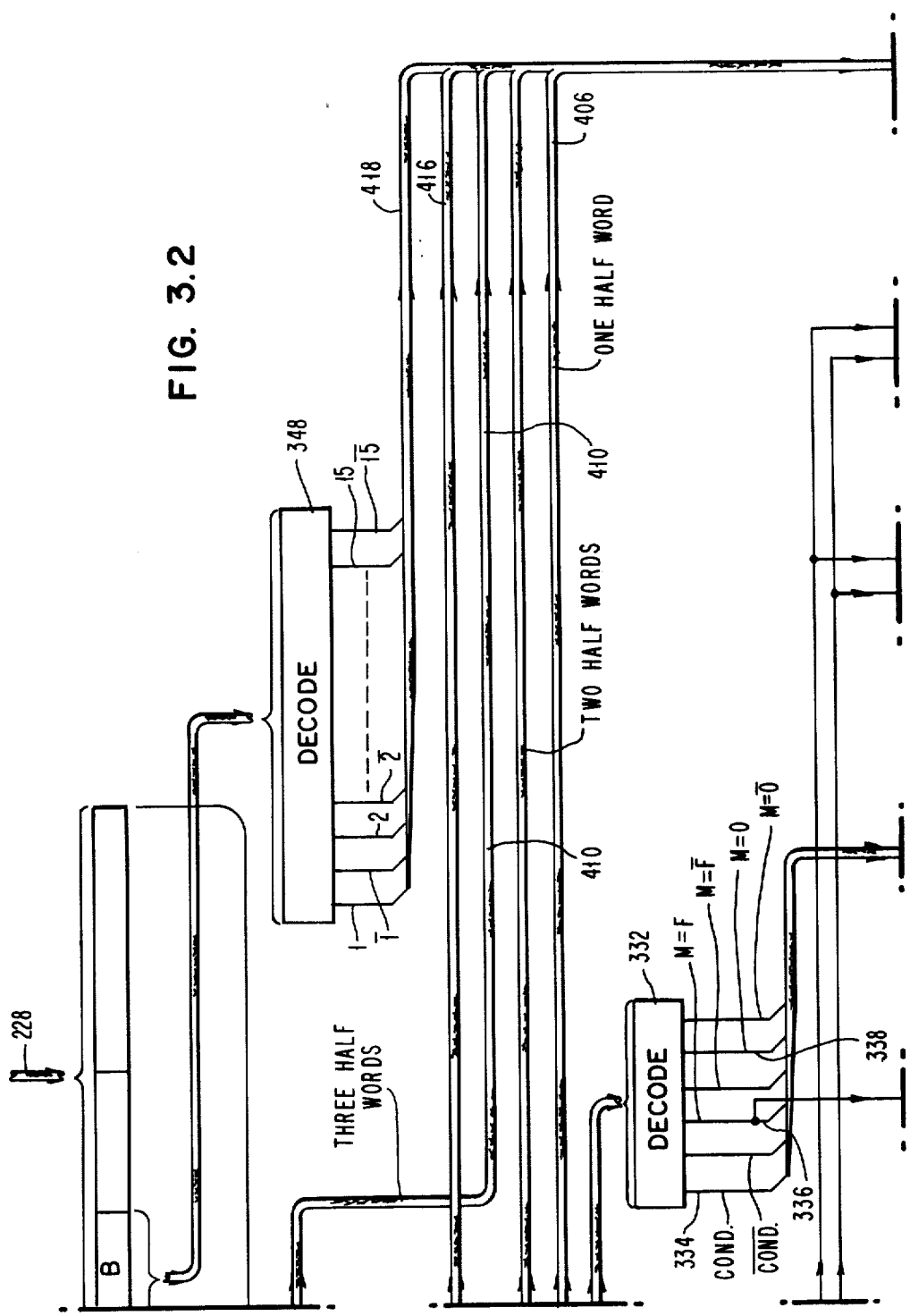
FIG. 3.2

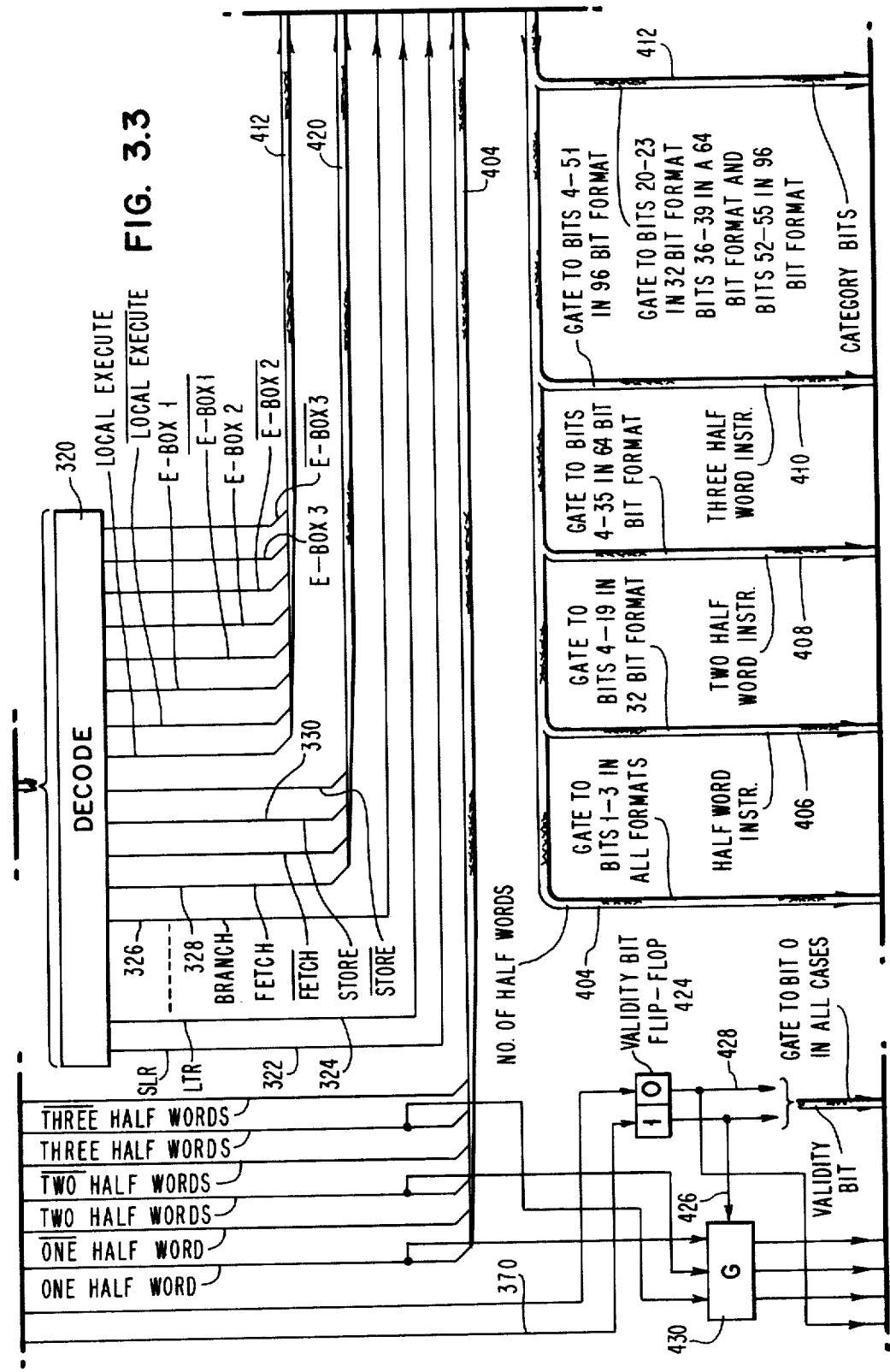
FIG. 3.3

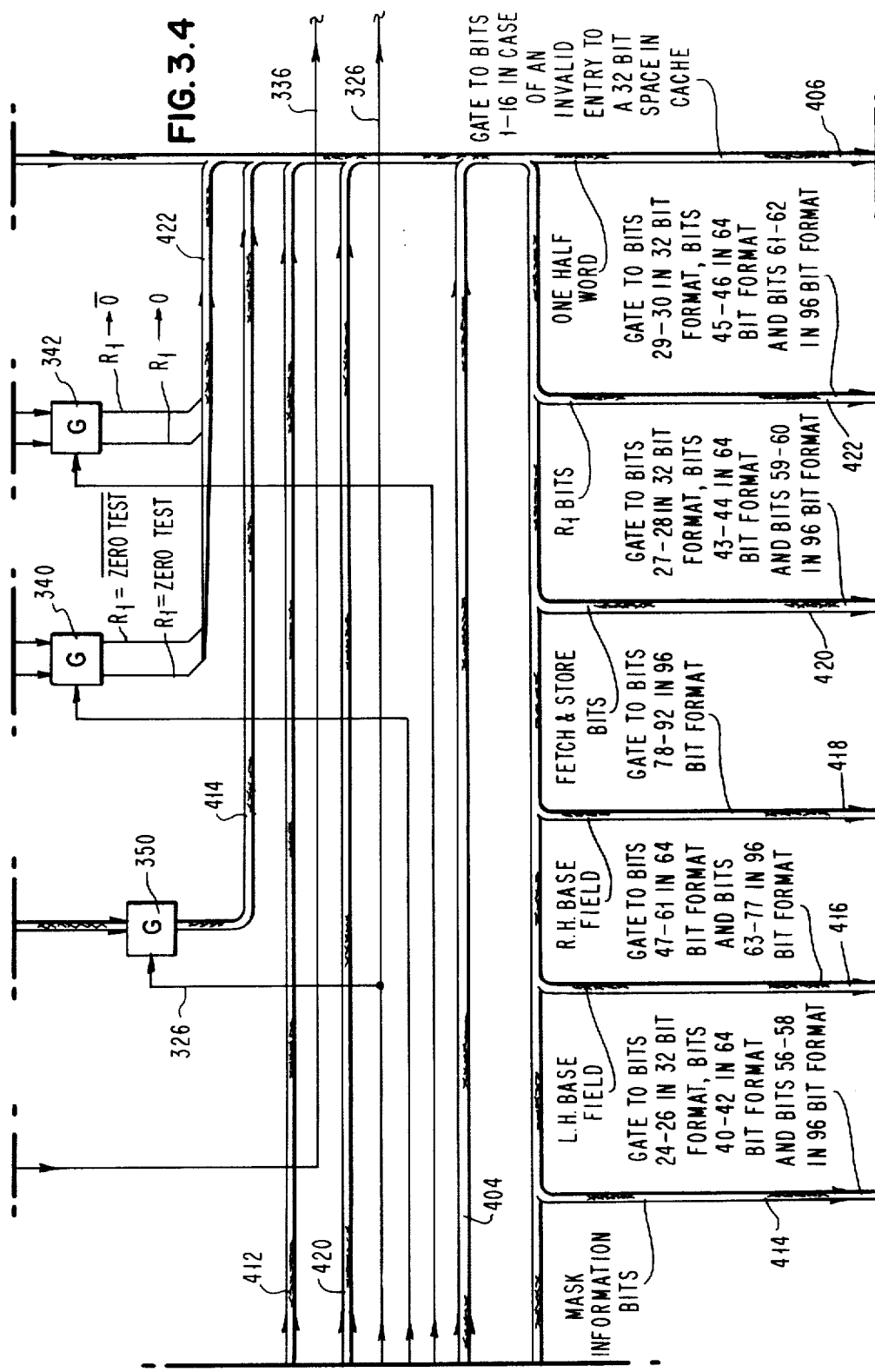

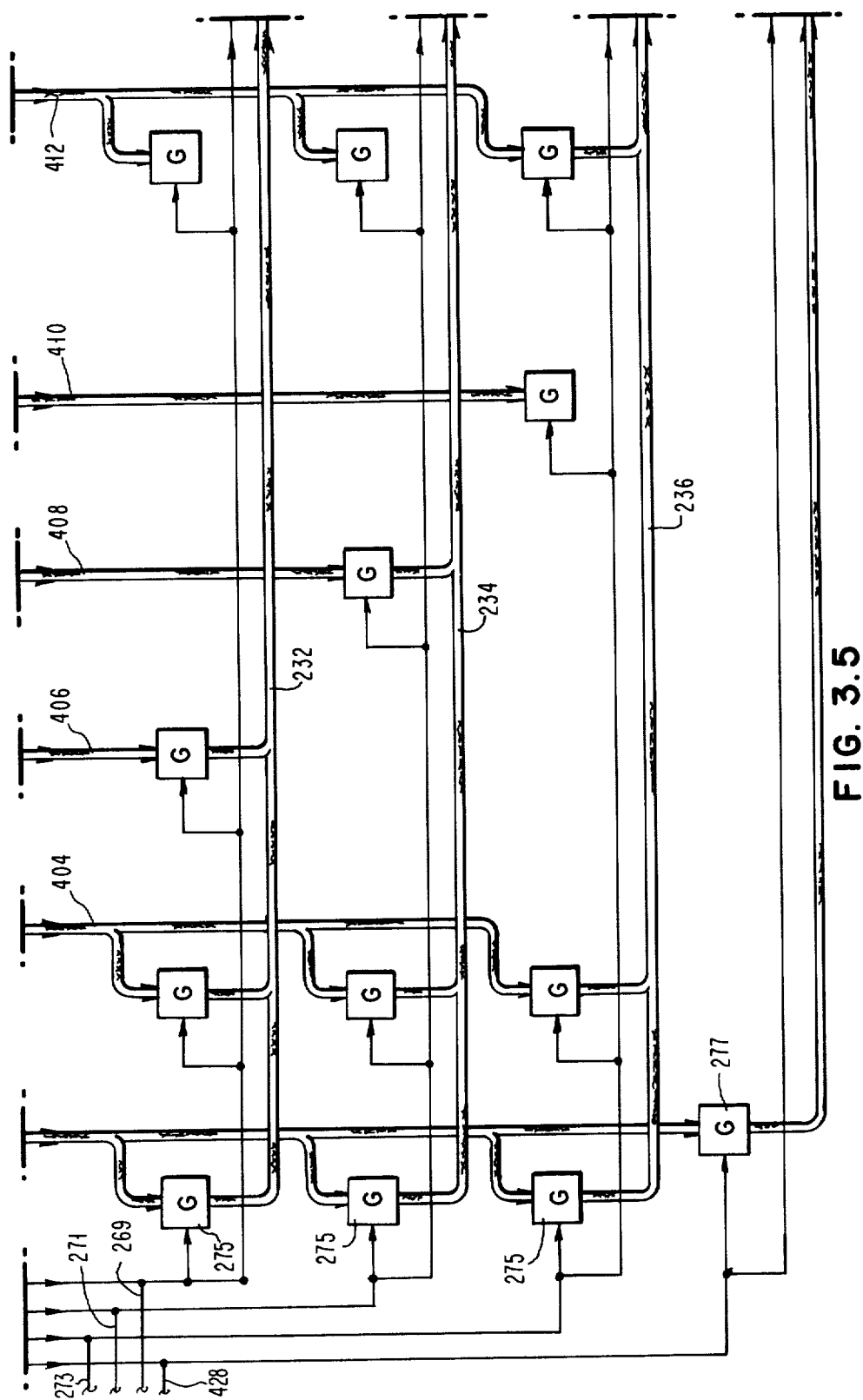
FIG. 3.5

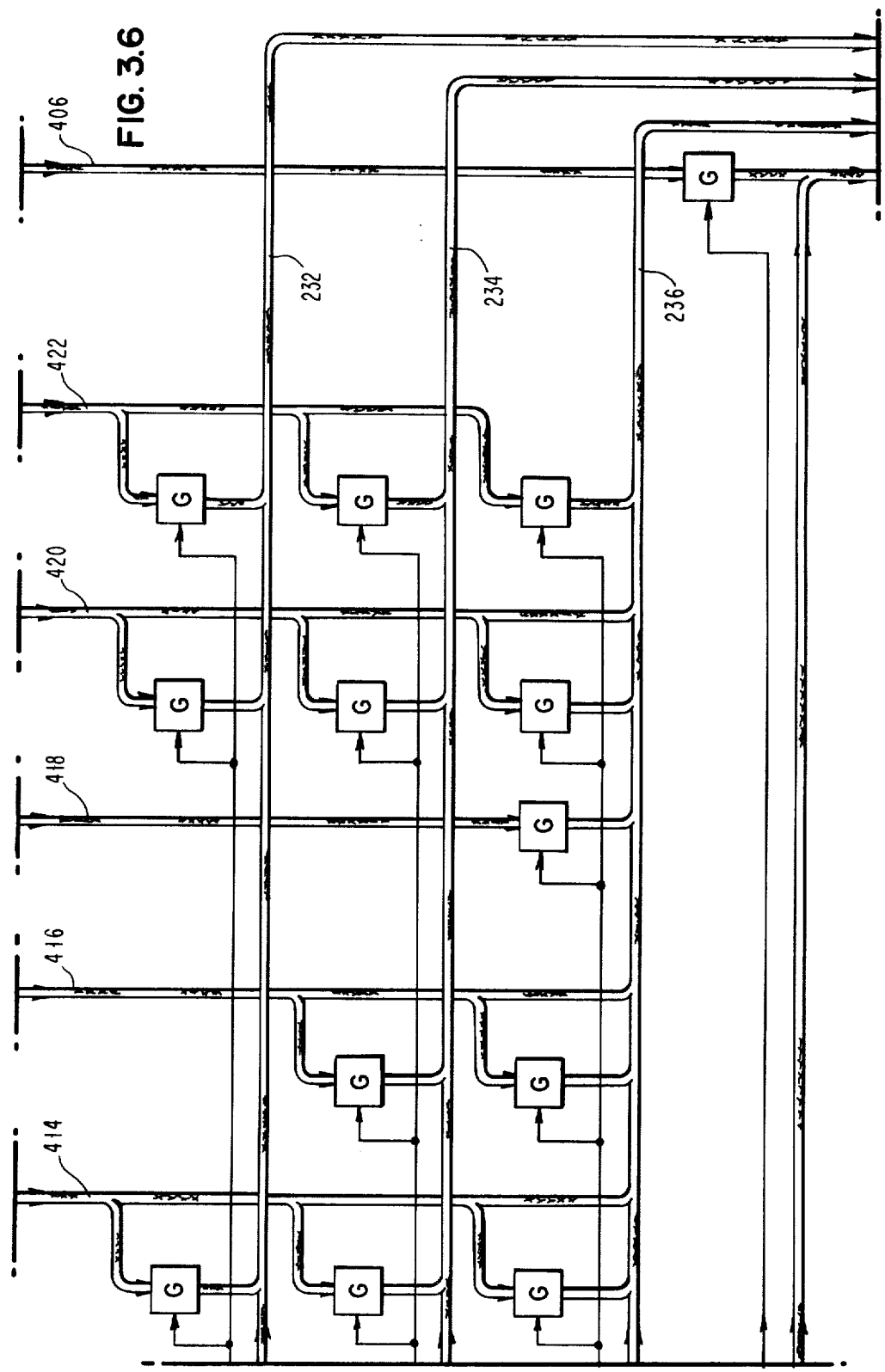

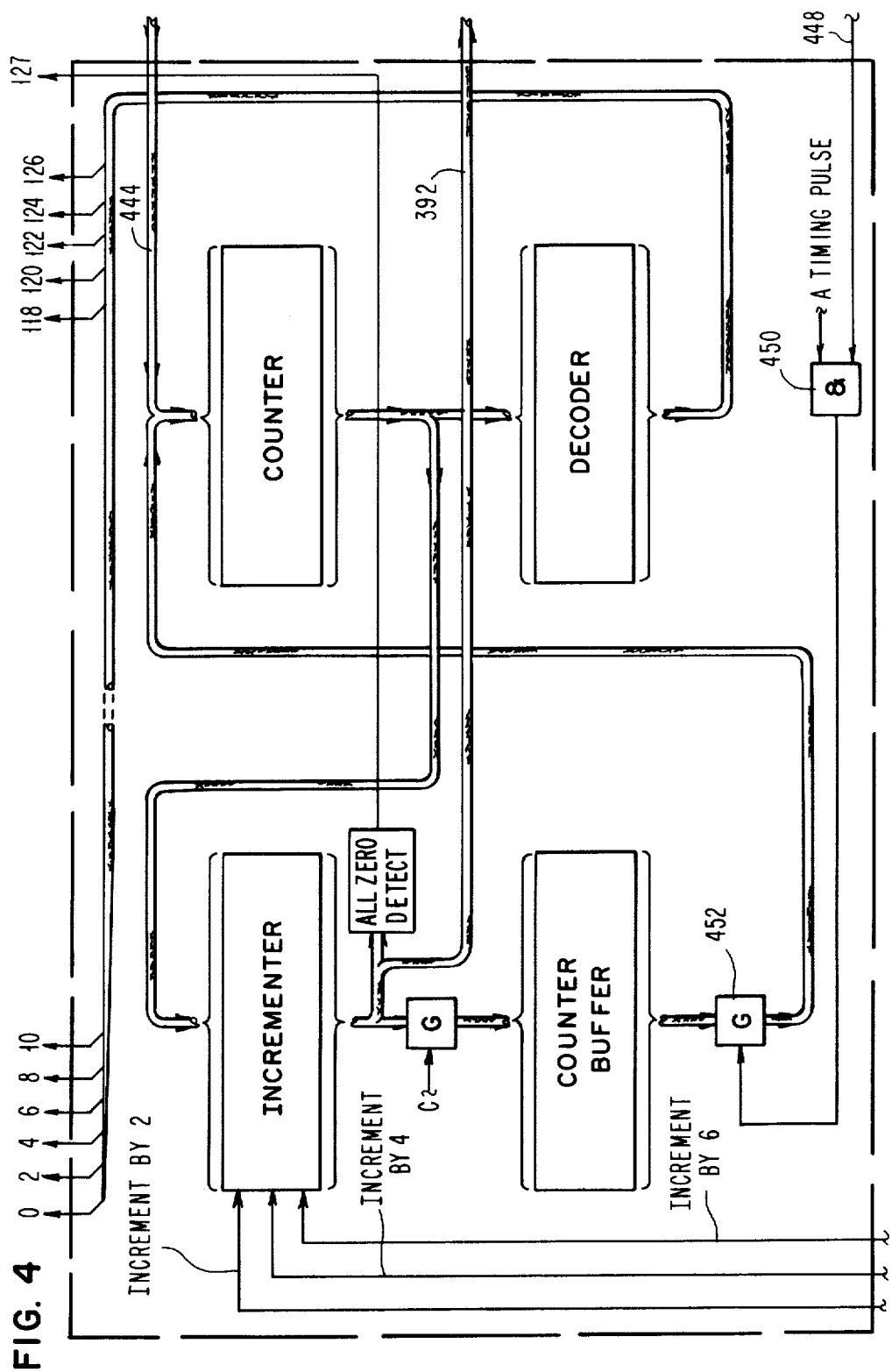

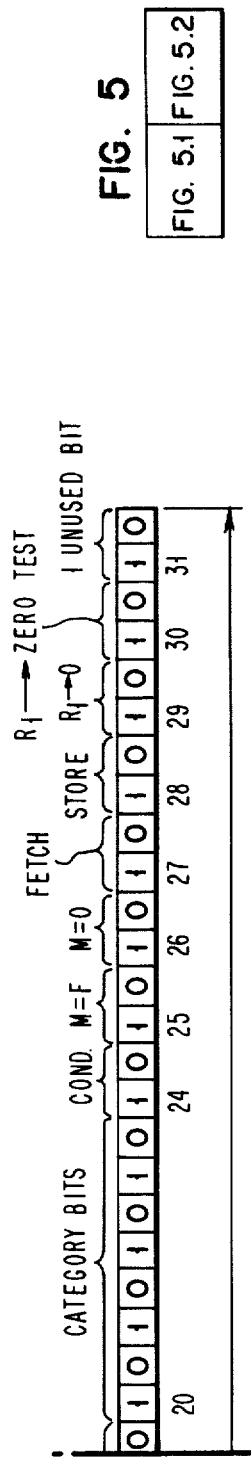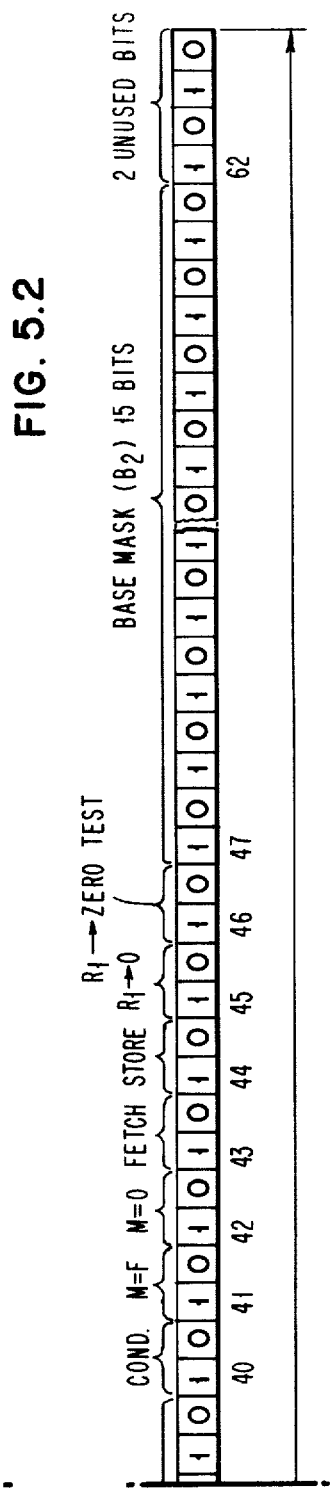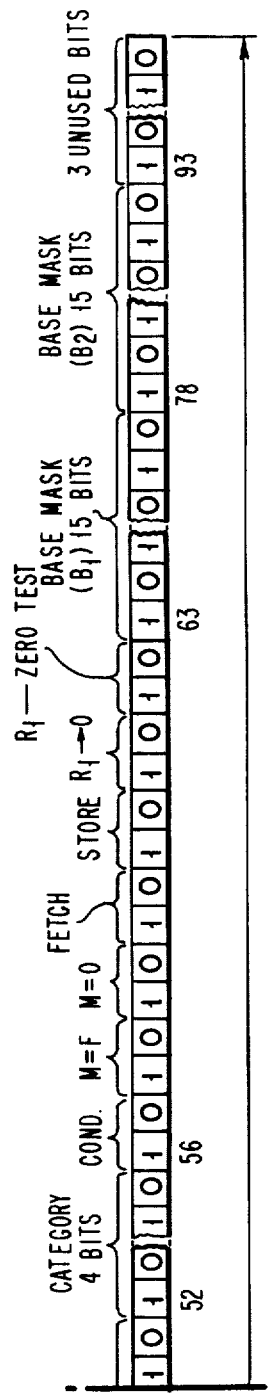
FIG. 5
FIG. 5.1 | FIG. 5.2
FIG. 5.2

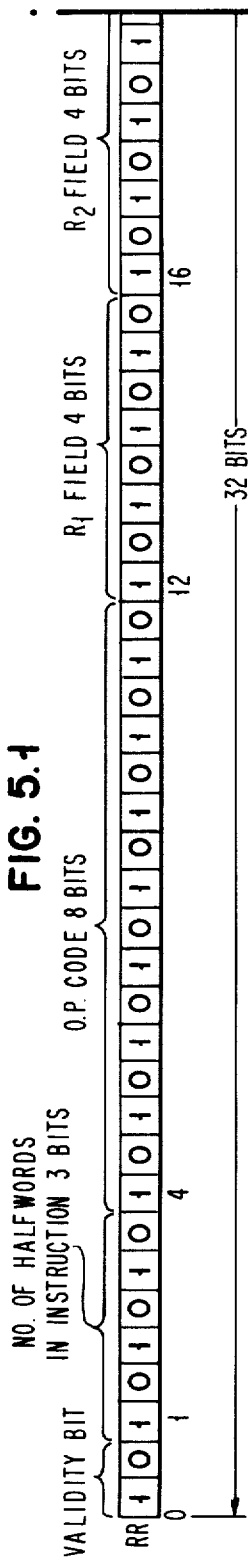
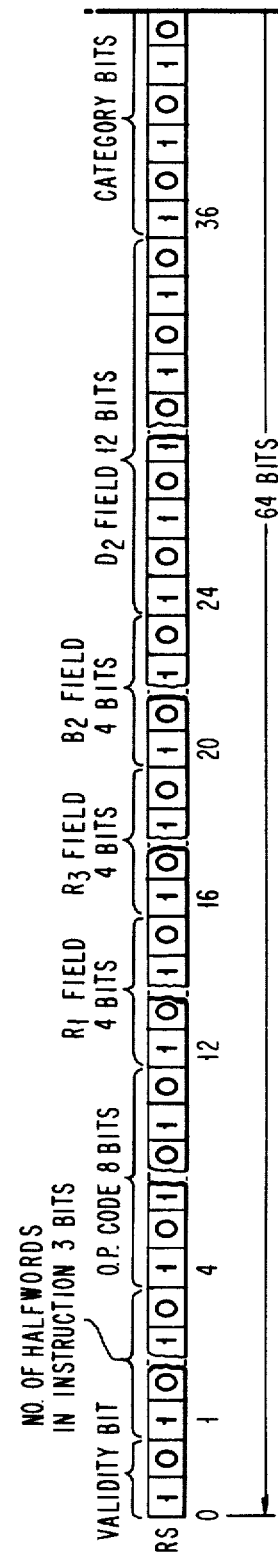
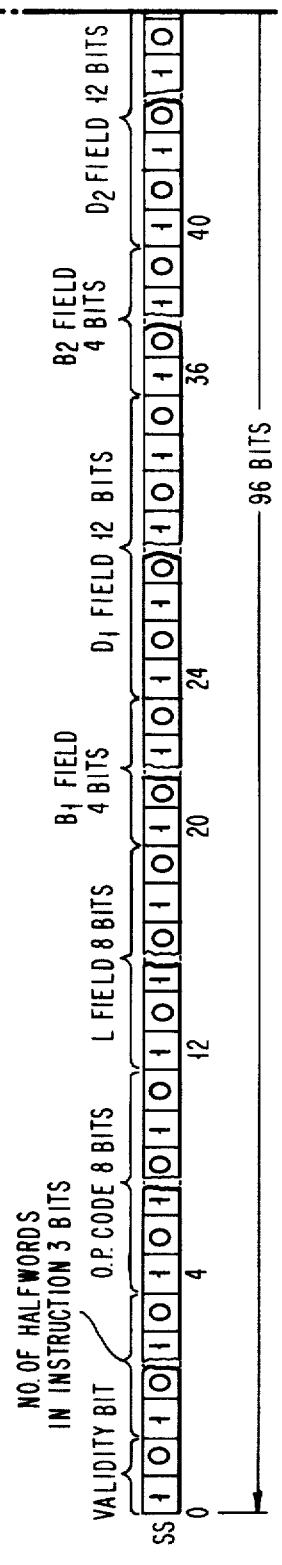
FIG. 5.1

FIG. 7.4

FIG. 7.1
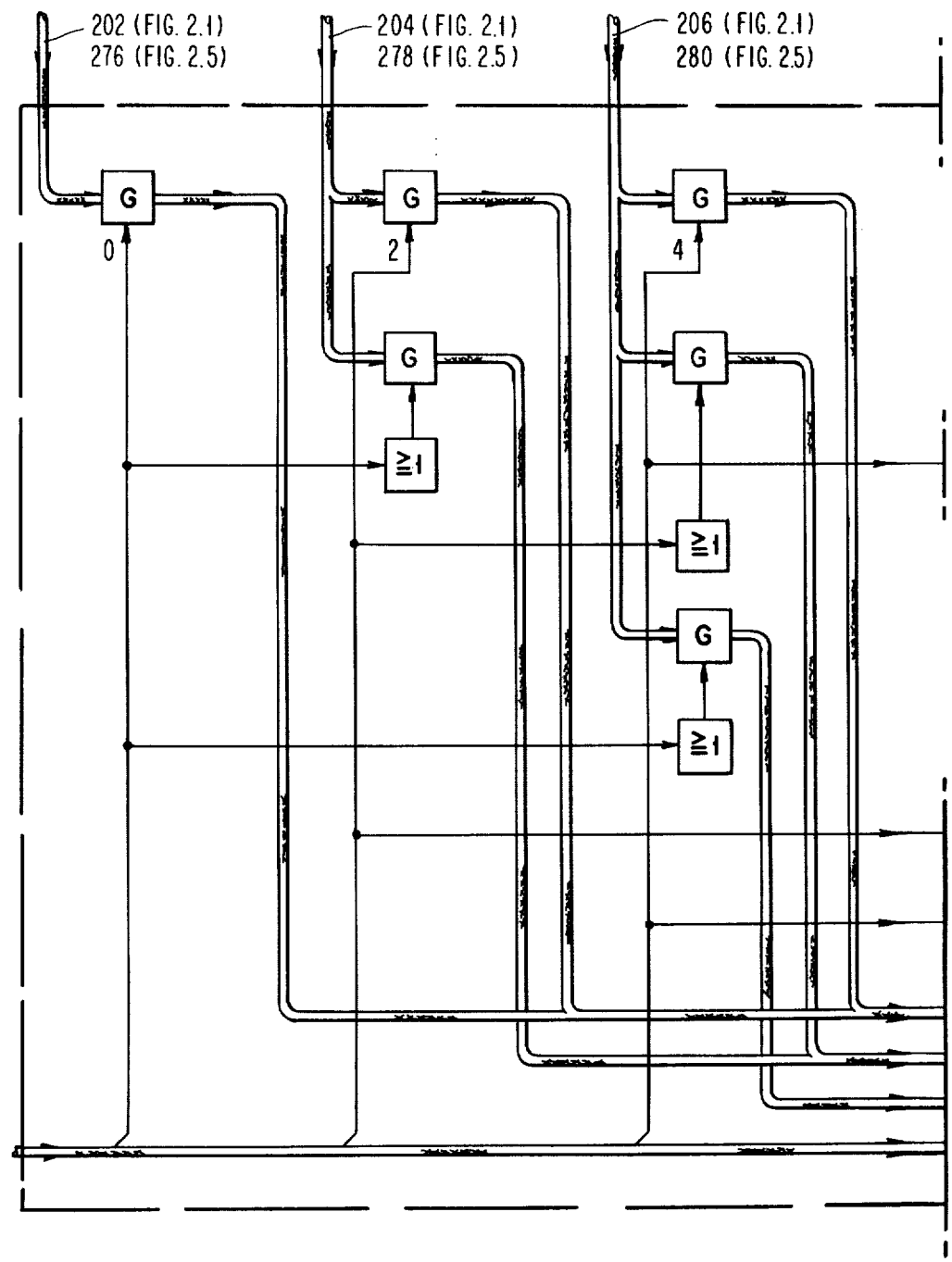

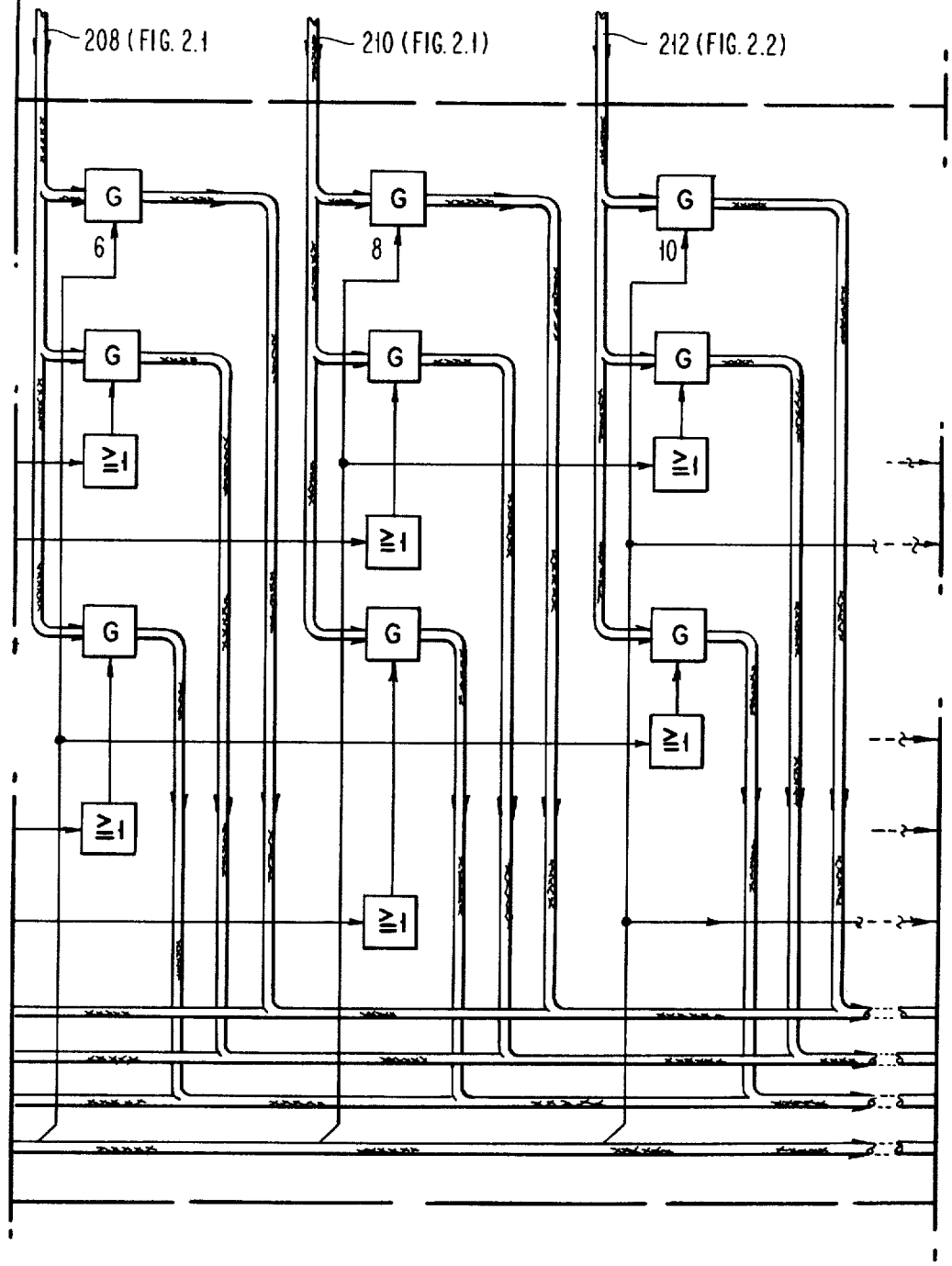
FIG. 7.2

FIG. 7.3
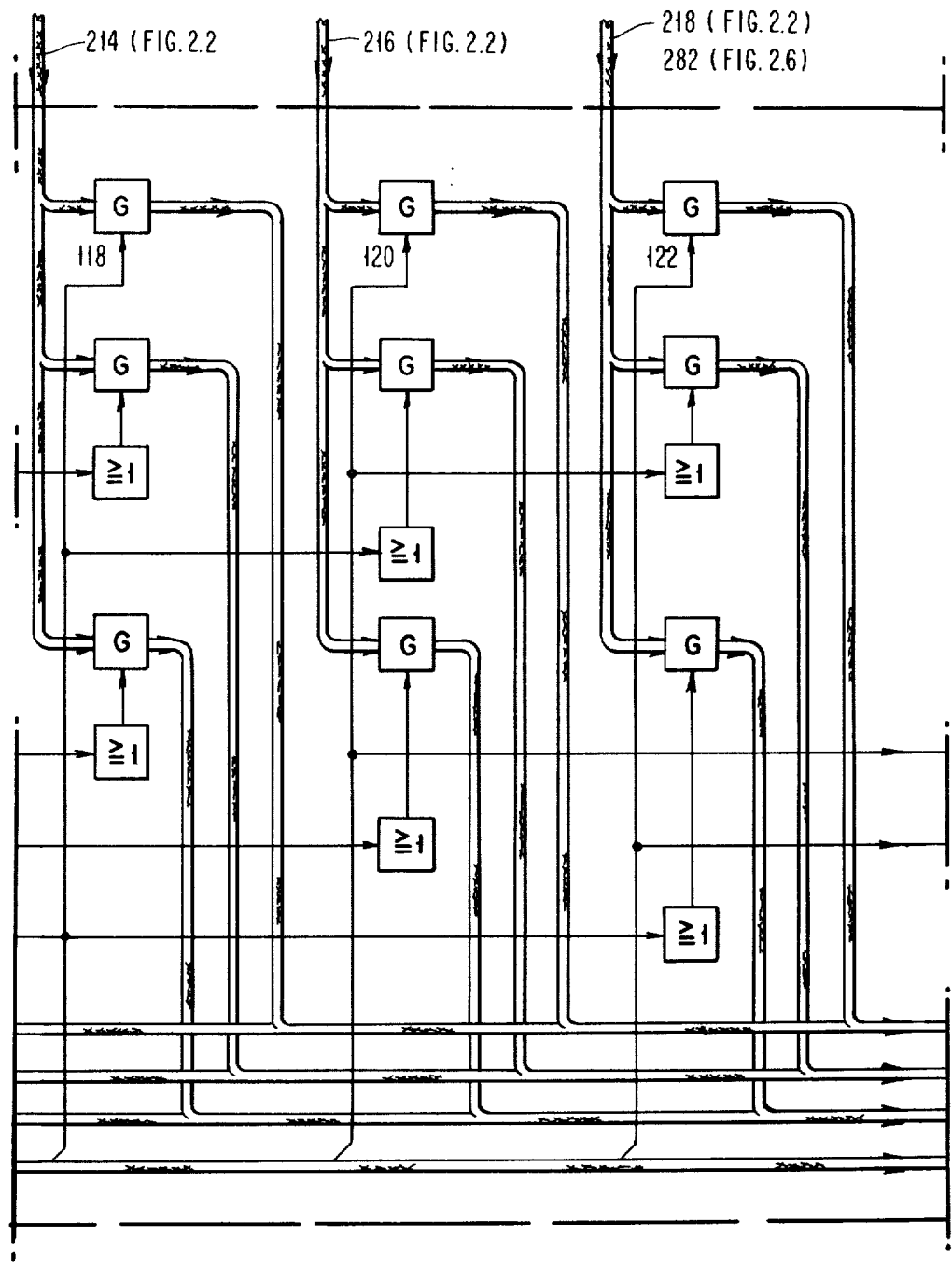

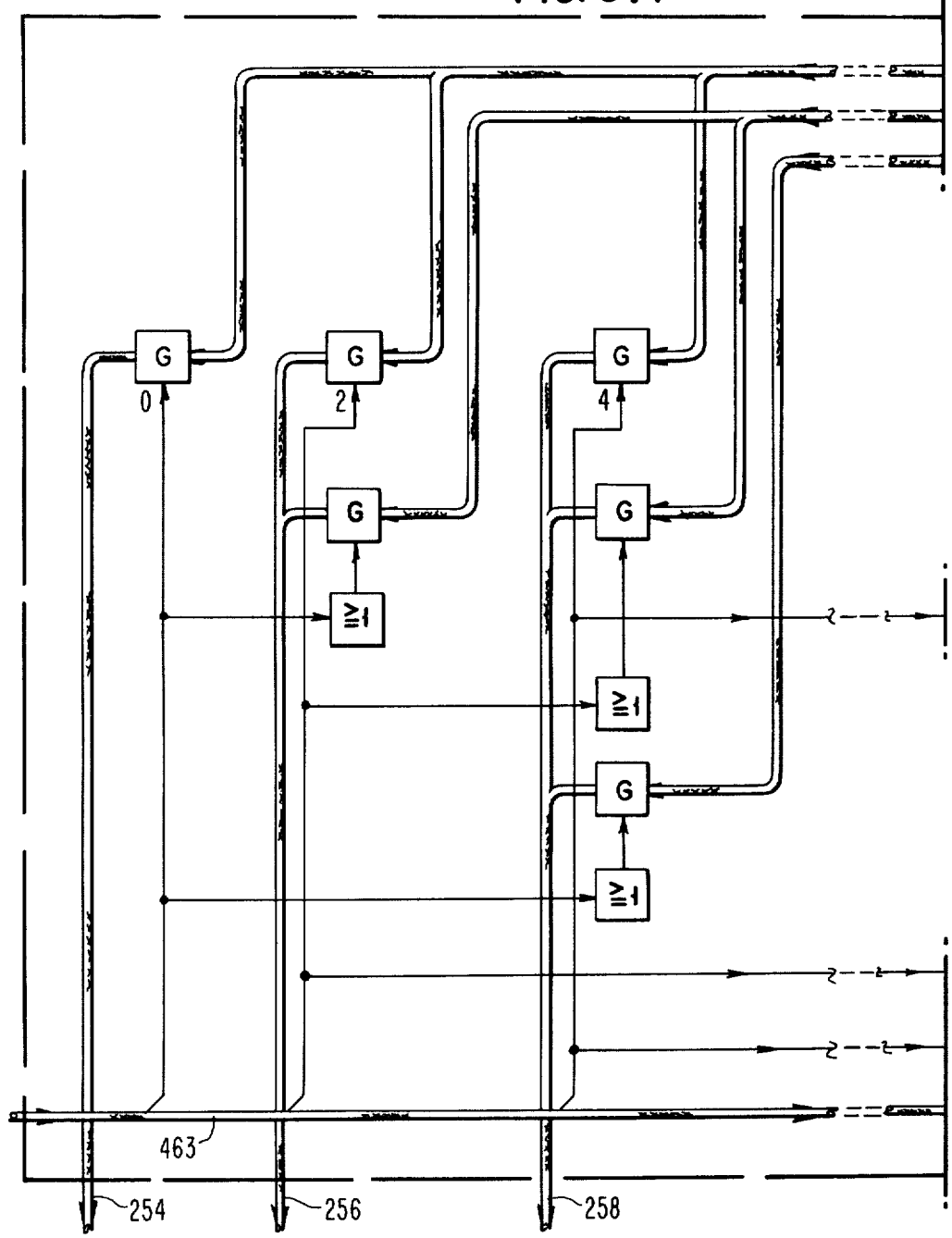

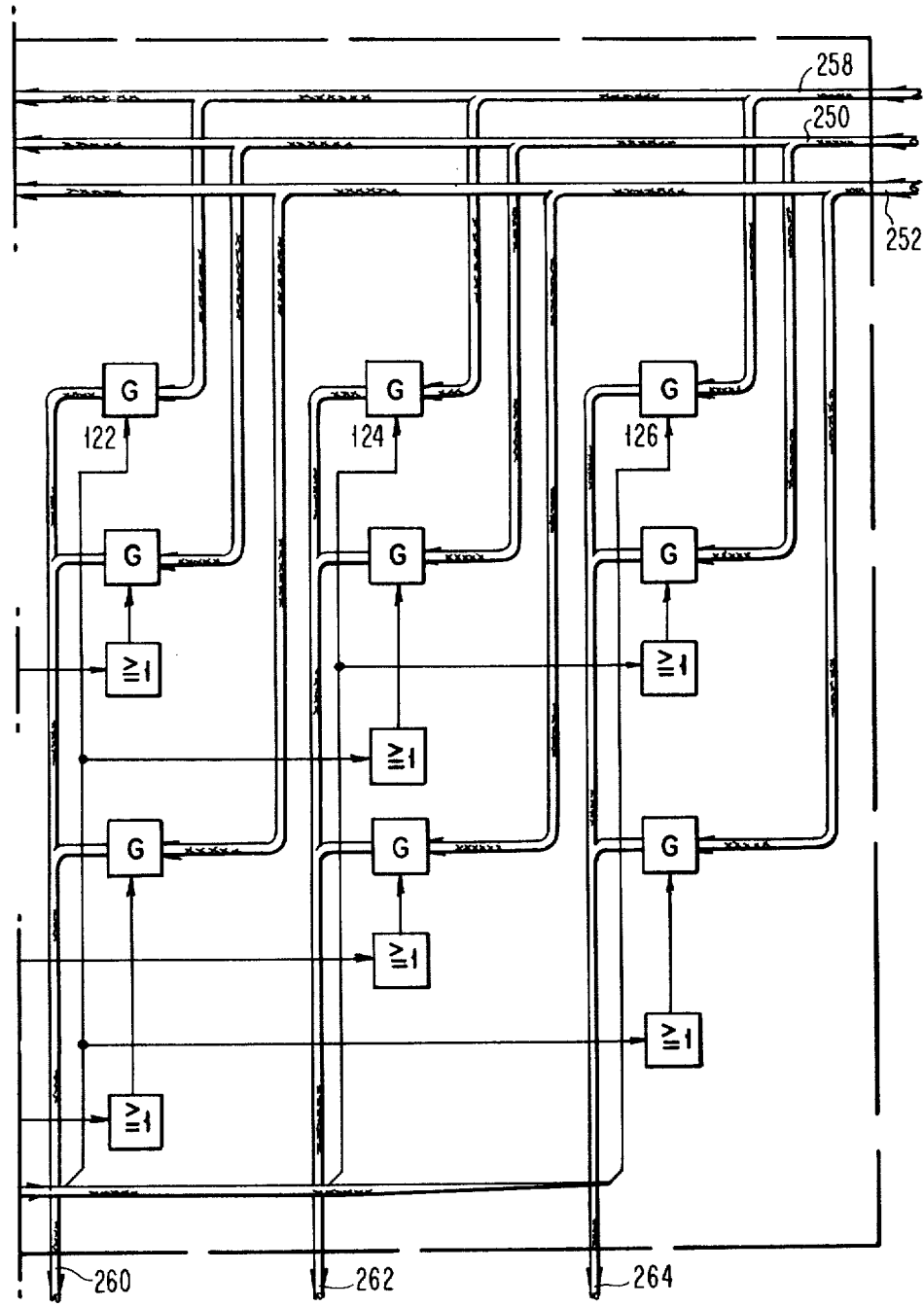
FIG. 8.2

CACHE MEMORY ARCHITECTURE WITH DECODING

DESCRIPTION

1. Technical Field

The present invention relates to improvements in data processing architectures utilizing a low capacity, high speed Cache memory interposed between the processor and a larger capacity backup memory system. More particularly, it relates to the instruction processing and execution controls of such a data processing system, including a Cache based hierarchical memory structure.

Large modern electronic data processing systems have processors with ever increasing operating speeds. This has resulted in the need for larger higher speed memory systems. As well known in the art, conventional memories having capacities sufficiently large to store or satisfy the data requirements of the sophisticated problems being solved on the processors have operating speeds much slower than the basic electronic processors or CPU's which perform the actual arithmetic and logic operations on the data.

In order to fully utilize the increased processor operating speeds, it has become necessary to somehow provide memory capabilities or some component of the overall memory system which will operate at a speed reasonably close to the speed of the basic processing unit or units.

The solution currently used in the art to alleviate the speed problem in large random access memories is to use a two or more level storage hierarchy including a small, fast Cache memory store (hereinafter referred to simply as a Cache) together with one or more large, relatively slower main memories. The system processor then communicates directly at essentially system speed with the Cache. If data requested by the processor unit is not in the Cache, it must be found in the memory (or memories) and transferred to the Cache where it necessarily replaces an existing block of data.

As will be readily apparent, in order for a Cache based hierarchical memory system to be effective, there must be a highly efficient control system to effect data transfer between the main memories and Cache and to control any data inputs from the system (channels, processing unit, etc.) to the Cache or main memories. If the transfer of data from the main memory to the Cache is not done efficiently, many of the advantages of using the high speed Cache will be lost primarily due to the processor waiting for required data to be transferred from the memories to Cache or vice versa. Many of the compromises and trade-offs necessary to optimize such a system are not readily apparent. Many design alternatives involving such trade-offs to maximize the efficiency of such a Cache Based hierarchical memory system have been made in the art. For example, U.S. Pat. No. 3,896,419 describes a Cache memory system wherein a requested in-Cache store is operated in parallel to the request for data information from the main memory store. A successful retrieval from the Cache store aborts a retrieval from the main memory. Thus, the two parallel operations represent assumption of a Cache hit and a Cache miss in parallel. If a hit in the Cache occurs, there is essentially no system time lost. However, if a Cache miss occurs, the access to main Memory will already have been started rather than waiting until the processor finds that the requested data is not in the Cache. Other compromises and trade-offs are enumerated in the following Background Art section.

2. Background Art

U.S. Pat. No. 3,806,888 provides a line fetch buffer to decrease the line fetch time from main storage to the Cache. The line fetch buffer is provided as part of main storage which then reads the line from the buffer to the Cache in the time which would otherwise be required to transfer a word from main storage to the Cache.

Japanese published examined patent application 53-24260 (filed as application 48-9086), published Apr. 12, 1975 and issued Apr. 12, 1978 in Japan, also provides a data buffer serially connected between main storage and a processor Cache. The processor may access a different line (i.e., different block) in the Cache while the line is being transferred from main storage to the buffer. But the line being fetched cannot be accessed by the processor until after the line fetch to the buffer is completed. Then, the processor accesses only the buffer for data in the fetched line. When the next Cache miss occurs, a processor wait results until the requested data is received from main storage. During the processor wait period, the line in the buffer is transferred to the Cache. The processor cannot access the Cache during the buffer to Cache transfer of the entire line.

U.S. Pat. Nos. 3,670,307 and 3,670,309 enable a processor request to access a Cache for data in a different line in the Cache while a line is being transferred from main storage to the Cache, but a processor request may not access data in the Cache in the line being fetched until the fetch is completed. These patents construct a Cache from plural BSMs, each BSM having its own busses, so that a request can access the busses of one BSM of the Cache concurrently with a line fetch from main storage accessing the different busses of other BSMs of the Cache.

U.S. Pat. No. 3,588,829 also delays a processor request during a line fetch to the Cache until the line fetch is completed from main storage to the Cache. However, the requested data, which is the first word of the line fetch, is transferred from main storage in parallel to both the Cache and the processor.

U.S. patent application Ser. No. 884,301 filed Mar. 7, 1978 entitled "Cache Control for Concurrent Access" (assigned to the same assignee as the subject application) provides two Cache access timing sub-cycles during each processor request provided during a processor machine cycle. The Cache is accessible to the processor during one of the Cache sub-cycles and is accessible to main storage during the other Cache sub-cycle. This invention is useful when the Cache technology permits the Cache to operate at twice the processor cycle rate.

U.S. Pat. No. 3,618,041 discloses a split-Cache architecture wherein data or operands go into a data Cache and instructions are separated and go into a separate instruction Cache. Separate control sections are provided so that the two Caches operate essentially independently of each other to improve the processing ability of the overall processing circuit.

None of the above patents disclose the inventive concept of the present invention but are cited to illustrate the state of the art wherein each of the patents essentially represents some unique design architecture compromise or trade-off which is intended to improve the overall performance of the system memory and thus the processor by ultimately speeding up the operation of the memory system relative to the processor's requirements for data and instructions.

SUMMARY OF THE INVENTION

It has been statistically determined that instructions which are transferred from main memory to a Cache memory are generally executed in the processor between three and four times. Therefore, with conventional organizations each instruction accessed from Cache by the processor must be separately decoded each time it is accessed. According to the present invention, all instructions gated from the Memory to the Cache are predecoded on the bus between the Memory and the Cache rather than in the processor itself. Thus, such instruction data is loaded into the Cache in a predecoded form. Therefore, each time the processor calls for an instruction from Cache the decoding operation will already have been partially or completely performed. As will be apparent, if an instruction is only used once, very little time saving will occur, however, if it is used more than one time, significant processor cycle time will be saved.

According to the specifically disclosed embodiment of the invention, a split-Cache configuration is disclosed wherein a separate Cache is provided for data and instructions. The decoding device of the present invention is accordingly located in the data line between Memory and the instruction portion of the split-Cache memory. Thus, any instruction appearing on this line will be automatically decoded by the predecoding mechanism and will be available to the processor in decoded form.

From the above general summary of the invention it will be apparent to those skilled in the art that it is a primary object of the present invention to provide a means for decreasing the cycle time of a processor equipped with a hierarchical memory system including a high speed, relatively low capacity Cache memory by predecoding all instructions transferred from the back-up memory to the Cache memory.

It is a further object of the invention to provide such a predecoding mechanism which is essentially hard-wired into the system requiring no action by operating personnel or applications running on the system.

It is another object of the invention to provide such a predecoding mechanism which has particular applicability to hierarchical memory systems of the type described wherein a split-Cache architecture is utilized.

These and other objects, features and advantages of the invention will be apparent from the following description of the preferred embodiment of the invention as set forth in the specification and claims.

BRIEF DESCRIPTION OF THE DRAWINGS

FIG. 2 is an organizational drawing for FIGS. 2.1 through 2.6.

FIGS. 2.1 through 2.6 comprise the overall wiring diagram of a preferred embodiment of the predecoder and Cache memory blocks as utilized in the hierarchical memory system organized as shown in FIG. 1.

FIG. 3 is an organizational drawing for FIGS. 3.1 through 3.7.

FIGS. 3.1 through 3.7 comprise the detailed wiring of the Logic Unit shown in FIG. 2.4.

FIG. 4 is a detailed drawing of the Memory Line Byte Counter, Decoder and Incrementer shown in FIG. 2.1.

FIG. 5 comprises an organizational drawing for FIGS. 5.1 and 5.2.

FIGS. 5.1 and 5.2 illustrate the three possible formats in which partially decoded instructions can exist in the Cache line.

FIGS. 7.1 through 7.4 illustrate the gating logic shown on FIGS. 2.1, 2.2, 2.5 and 2.6 which performs the gating from the Memory line to the Logic Unit and from the Cache line to the Cache Buffer.

FIG. 8 comprises an organizational drawing for FIGS. 8.1 and 8.2.

FIGS. 8.1 and 8.2 show the gating logic block on FIGS. 2.3 and 2.4 which performs the gating from the Logic Unit to the Cache Line.

DISCLOSURE OF THE INVENTION

The foregoing and other objects, features and advantages of the present invention will be apparent from the following more particular description of the preferred embodiment of the invention taken in conjunction with the above-described accompanying drawings.

For illustrative purposes the present invention will be described in the context of a bilevel memory system, i.e., a back-up Memory and the Cache. However, it will be readily apparent to those skilled in the art that the inventive concept is readily applicable to a multilevel memory system having more than two levels of memory or having parallel memories at one or more levels.

Figure 6:
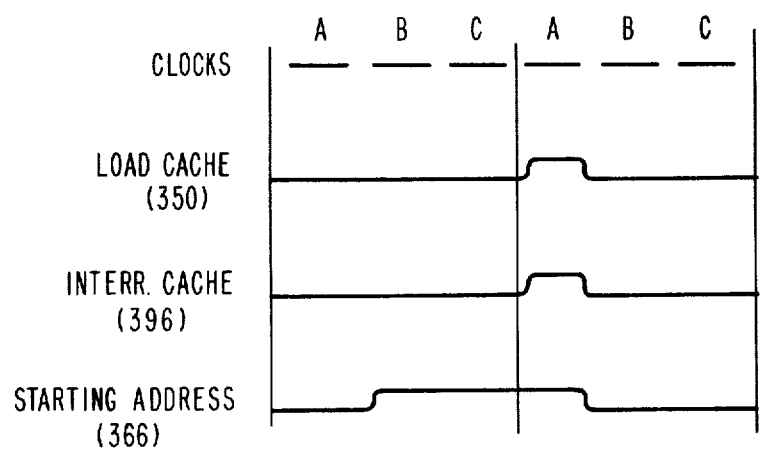
FIG. 6 is a timing chart and a list of the possible control states for the decoder.

As will be readily apparent to those skilled in the art, the physical hardware design of any system may take on a wide variety of configurations depending upon various design choices. Thus, the presently disclosed decoder is a fully stand-alone unit, having essentially asynchronous controls which are hard-wired to perform the various enumerated functions depending, for example, on whether a "load Cache" or "interrogate Cache" instruction is being performed. Timing is accomplished basically by the A, B and C clocks as shown in FIG. 6 and in the timing cycle chart at the top of FIG. 2.1. With regard to the timing functions and overall operation of the system, reference should also be made to Table 1, wherein the basic system functions occurring during the various clock cycles are set forth relative to the "load Cache" and "interrogate Cache" operations. It will be noted in Table 1 that when an "interrogate Cache" operation occurs the validity bit is checked and is set to a one, this means that the requested instruction has been predecoded and may be gated directly to the processor. If, on the other hand, the validity bit is set to a zero, it means that the specific instruction being requested has not been predecoded and must be so predecoded before transferring to the execution unit of the processor. The operation of the system, however, will be set forth in detail subsequently.

TABLE I

| OPERATION REQUESTED | CLOCK CYCLE | | |
|---|---|---|---|
| | "A" | "B" | "C" |
| LOAD CACHE | | | |
| 1. | Start address —>counter | Not used | Gate Logic —>cache line |
| | turn on FF424 (F1912B) | | Gate A + 1 —>counter buffer |
| | Enable mem. line —>logic | | |
| 2. | Gate counter buffer —>counter | Not used | Gate logic —>cache line |
| | mem-line —>logic still enabled | | Gate A + 1 —>counter buffer |
| 3. | Gate counter buffer —>counter | Next addr is zero OR | Gate logic —>cache line |
| | mem-line —>logic still enabled | this was uncond Branch | Gate A + 1 —>counter buffer |
| | | Not used | turn off FF424 (FIG. 12B) |
| 4. | Gate counter buffer —>counter | Not used | Gate unprocessed logic halfword —>cache line |
| | mem-line —>logic still enabled | | Gate A + 2 —>counter buffer |
| 5. | Gate counter buffer —>counter | (Next Addr = start addr) | Gate last halfword —>cache line |
| | mem-line —>logic still enabled | | Terminate LOAD CACHE operation |
| INTERROGATE CACHE | | | |
| 1. | Start address —>counter | Gate cache line —>cache buffer | |
| | | (if validity bit is "1") | Gate cache buffer —>E unit |
| | | | Terminate INTERROGATE CACHE operation |
| INTERROGATE CACHE | | | |
| 1. | Start address —>counter | Gate cache line —>cache buffer | |
| | | (if validity bit is "0") | Gate logic cache line |
| | | enable cache buffer —>logic | Proceed to step 2 of LOAD CACHE (except |
| | | | cache buffer —>logic instead of mem line) |
| 2. | Gate counter buffer —>counter | Cache line —>cache buffer | |
| | | if validity bit is "0" ——————— | Gate logic cache line |
| | | if validity bit is "1" ——————> | Terminate Interrogate Cache |
| | | OR Next addr is zero | Signal to processor to |
| | | OR This was uncond. branch | re-interrogate cache line |

The examples of instruction decoding or partial decoding as shown herein are intended to be illustrative only. More sophisticated and detailed decoding of other types of instructions would be obvious to those skilled in the art. The possibilities of said further decoding would in most instances, depend upon the architecture of the host processor and also on the probable frequency of occurrence of the particular instructions being considered as candidates for such decoding.

It is, of course, apparent that in order for the advantages of the present invention to be realized, the instruction unit of the host processor must be modified to utilize the particular degree of decoding done in the predecoder unit of the present invention. Basically, this simply means that the processor's instruction unit must be configured to utilize the decoded instructions and not repeat the decoding. This, of course, would be obvious to those skilled in the art and accordingly, the details of a modified instruction unit are not specifically shown.

In the present embodiment, it is assumed that a split-Cache architecture is utilized in the hierarchical Memory Unit (i.e., separate data and instruction Caches). Accordingly, the present decoder, in effect, straddles the instruction line between the Memory and Cache. This may be clearly seen in the high level functional block diagram of FIG. 1.

It should also be clearly understood that the principles of the present invention could equally well be applied to a single Cache architecture by merely providing, in effect, a selection means whereby data is routed around the decoder and instructions pass through the decoder where they are suitably processed.

BEST MODE FOR CARRYING OUT THE INVENTION

Figure 1:
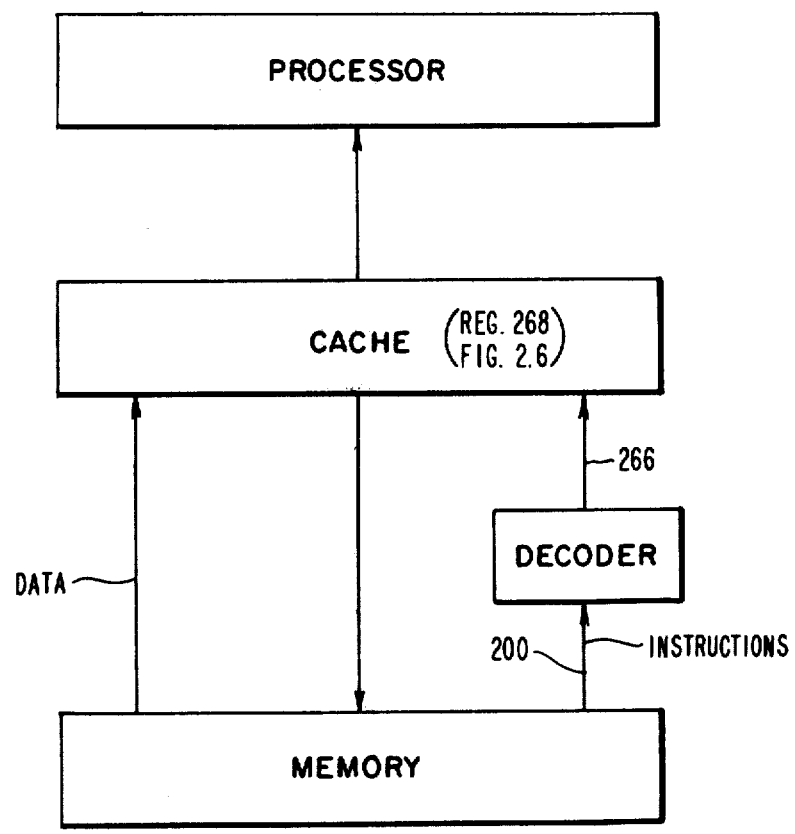
FIG. 1 is a functional block diagram of a computing system having a hierarchical memory system organized in accordance with the teachings of the present invention.
Figure 24:
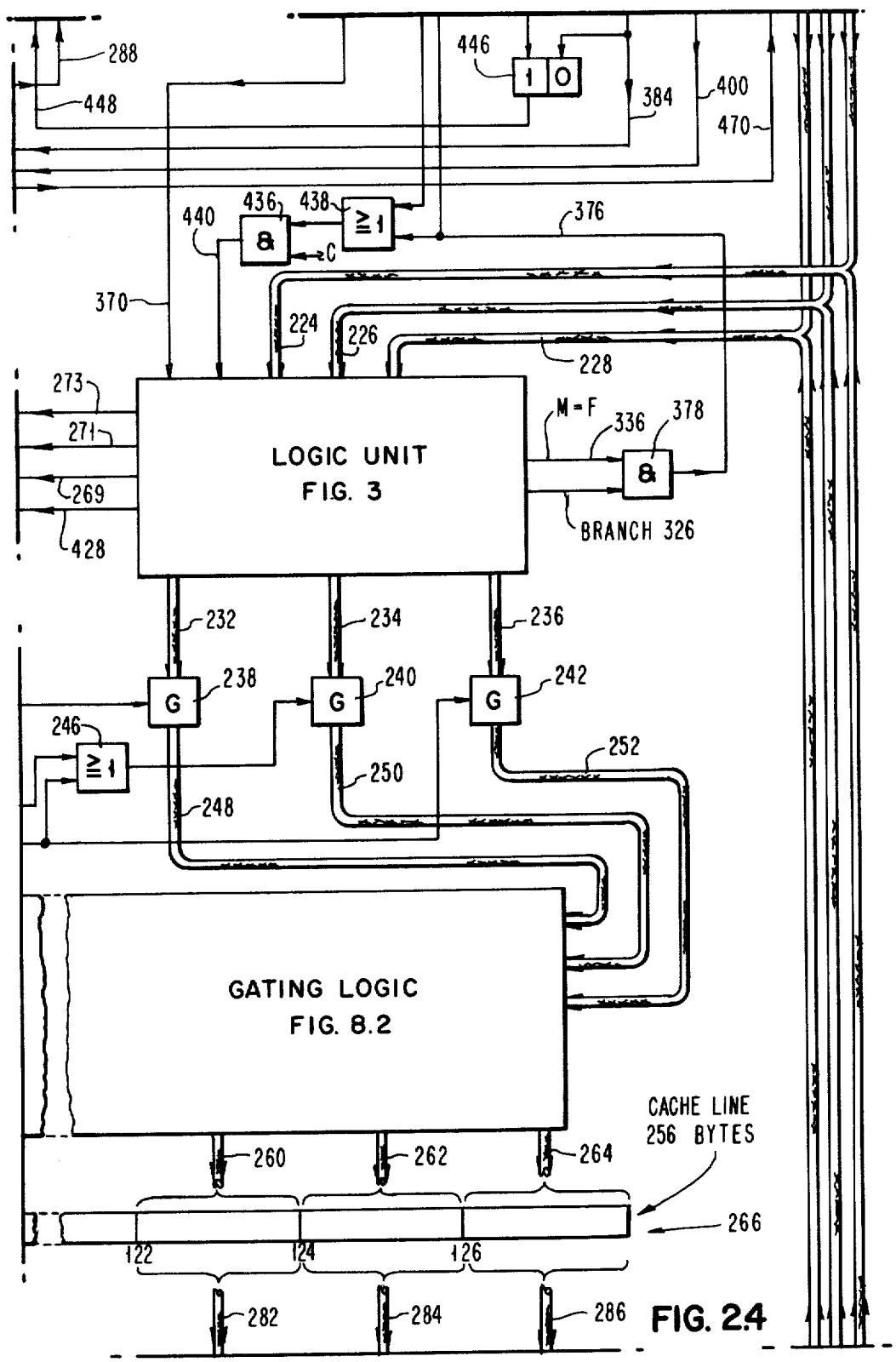

Referring now to the specifically disclosed embodiment of the present invention as set forth in the figures, reference should first be made to FIG. 1 which is a high level block diagram of a typical processor system equipped with a multi-level or hierarchical memory system having an extremely high speed relatively small capacity Cache Memory organization to which all data and instructions must pass on the way to the processor.

In the present embodiment, it is assumed that the system controls and architecture define a split-Cache configuration, and accordingly, only instructions pass from Memory to the instruction Cache through the Decoder Unit which constitutes the essential hardware portion of the present invention. Such a split-Cache architecture, is disclosed in U.S. Pat. No. 3,618,041. It will be apparent to those skilled in the art that the split-Cache is not a new concept per se. It is assumed for the purpose of the present embodiment that the present predecoder mechanism is coupled to an IBM System 360 Model 91 Processor System. For a complete and detailed description of the overall operation of the IBM Model 91 Processor, reference is made to the IBM Journal of Research and Development, Volume 11, No. 1, January 1967. A number of articles describing various aspects of the Model 91 and particularly the use and architecture of a hierarchical memory organization including a Cache memory as well as a description of the instruction formats are set forth on pages 2-68 of this journal.

It should be understood, however, that the IBM 3033 Processor is but one example of the wide applicability of the present invention since any Cache organized hierarchical Memory System could be readily modified to incorporate the advantages of the herein disclosed concepts.

It should be understood that the particular functional interrelationship of the blocks of FIG. 1, show the Decoder and Cache as separate functional blocks, which in reality they are. However, in the detailed functional/logical diagram of the FIG. 2 (2.1 through 2.6) the instruction portion of the Cache Memory is shown on FIG. 2.6 as a Cache Buffer 268. Similarly, the memory line 200 is shown on the detailed drawing of FIGS. 2.1 and 2.2 by the reference numeral 200 and the Cache line proceeding from the present decoding system to the Cache Buffer 268 as shown by reference numeral 266 on FIG. 2.4.

Figure 7:
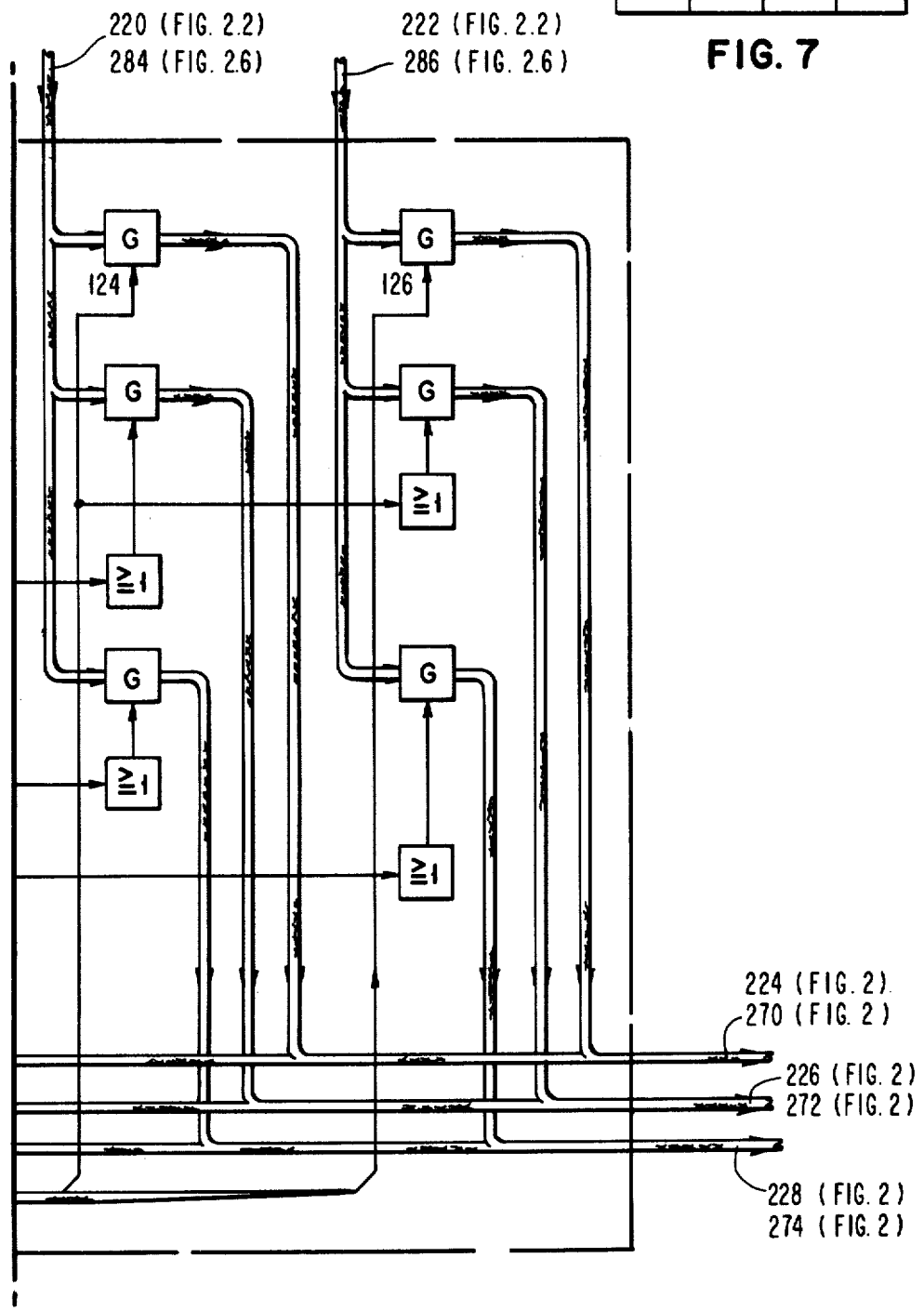
FIG. 7 comprises an organizational drawing for FIGS. 7.1 through 7.4.

As stated previously, FIG. 2 (2.1 through 2.6) shows the basic decoder hardware, wherein various of the details of said hardware in the Memory Line Byte Counter and decoder is shown in detail in FIG. 4, the Logic Unit is shown in FIGS. 3.1 through 3.7 and details of the various gating logic blocks shown in FIG. 2, are shown respectively in FIGS. 7 (7.1 through 7.4) and 8 (8.1 and 8.2).

The degree of instruction expansion due to the partial decoding features of the present invention may be seen by quick inspection by referring to the Memory line 200 appearing at the top of FIGS. 2.1 and 2.2, where it will be noted that this line has a maximum width of 128 bytes, whereas the Cache line 266 at the bottom of FIGS. 2.3 and 2.4 has a width of 256 bytes. Thus, an expansion of up to double the width of the original instructions appearing in the Memory line is provided for.

It should also be noted in passing that the majority of the actual instruction decoding occurs within the Logic Unit shown in FIGS. 3.1 through 3.7 and to a much lesser extent in the "Memory Line Byte Counter" shown in detail in FIG. 4.

Proceeding now with a detailed description of the present embodiment on FIGS. 2.1 and 2.2, it is assumed that, when a Memory line has to be transferred to Cache, it is first brought into the buffer 200 at the top of FIGS. 2.1 and 2.2. This buffer holds 128 bytes. In this embodiment, it is assumed that the buffer 200 is addressed by multiples of half words. Therefore, only even numbered addresses such as zero, two, four and so forth are used to address the buffer 200. Each half word in the buffer 200 can be gated to one of the cables 224, 226 or 228 by the gating shown in FIGS. 7.1 through 7.4.

As will be understood more in detail later, there are always three half words gated to those three cables 224, 226 and 228. However, it is possible that only one half word, two half words or three half words will find their way to the Cache on any one cycle.

Cables 224, 226 and 228 extend to the Logic Unit on FIG. 2.4. There will always be three half words applied to the Logic Unit and it will be possible to gate all three into the Cache at one time if this is necessary. However, as stated before, there will be many times when only the left-hand half word in the instruction buffer will go into the Cache or only the two left-hand half words will go into the Cache. Mechanism is provided to advance the "Memory Line Byte Counter" in accordance with how many half words are transferred from the Logic Unit to the Cache each time.

The Logic Unit will be explained in detail later and it is shown on FIGS, 3.1 through 3.7.

The Logic Unit as shown on FIG. 2.4, partially decodes the instructions and inserts additional bits. The original instruction along with these additional bits is then gated by one or more of cables 232, 234, and 236 which extend through gates 238, 240, 242 to cables 248, 250 and 252 to one or more of cables 254–264 inclusive and thus fund their way to the Cache line. The Cache line requires double the space of the memory line. For example, a sixteen bit instruction in the memory line will be reformed into a 32 bit format and placed in the Cache line. A 32 bit instruction will be changed into a 64 format and be placed in a section of the Cache line which is 64 bits long. A three half word instruction (of 48 bits) will have added to it additional bits which will make it 96 bits long so that when it is put into the Cache line it occupies a space 96 bits long.

These spaces in the Cache line are addressed in the same fashion that half words are addressed in the memory line. For example, address "zero" in the Cache line means a space 32 bits long. An address "two" or "four" also mean a space 32 bits long. As will be understood more in detail later, the "Memory Line Byte Counter" through the gating in FIG. 7.1 through 7.4 always addresses three half words in the memory line at one time and also through the gating in FIGS. 8.1 and 8.2, addresses three spaces in the Cache line at the same time. For example, if the "Memory Line Byte Counter" is on "zero", it will address addresses "zero", "two", and "four". The "Memory Line Byte Counter" can be incremented by "two", "four" or "six". Thus, while it is true that there are always three half words in the Logic Unit on FIG. 2.4, it is possible that only one or two of these half words will be actually partially decoded and transferred to the Cache. If only one half word is used, the "Memory Line Byte Counter" is only advanced by "two". If two half words are used in the Logic Unit, then the "Memory Line Byte Counter" is incremented by "four" and, if all three of the half words in the Logic Unit are used, then, the "Memory Line Byte Counter" is incremented by "six". It may be seen that, in many cases, where only one or two half words are used, the input to the Logic Unit is written over but this does no harm, the half words are, in effect, merely moved to the left.

From the Memory line on FIGS. 2.1 and 2.2, information is moved to the Logic Unit on FIG. 2.4. Here the half words are processed and later gated into the Cache. Reference to FIGS. 5.1 and 5.2 will show the three different formats which enter the Cache. For example, an RR instruction, which is normally 16 bits long, will enter the Cache in a 32 bit format. An RS instruction, which is normally 32 bits long, will enter the Cache in a 64 bit format and an SS instruction which is normally 48 bits long will enter the Cache in a 96 bit format. These three different formats appear on the cables 232, 234 and 236 which exit from the Logic Unit shown on FIG. 2.4. Each of these cables is capable of transmitting 32 bits to the Cache. An RR instruction which, as mentioned before, is normally 16 bits long, when partially decoded, will have a format of 32 bits and will appear on cable 232 with one unused bit. An RS instruction will appear on both cables 232 and 234 and in cable 234 there will be two unused bits. An SS instruction will appear on all three cables 232, 234 and 236 and in cable 236 there will be three unused bits. The validity bit is always the left-hand bit on cable 232. The RR, RS, and SS instruction formats are specifically shown in FIGS. 5.1 and 5.2.

If the Logic Unit on FIG. 2.4 processes an RR instruction, then wire 269 will be active in order to enable gate 238 through the OR circuit 244 in order to gate cable 232 to cable 248 which extends through gating shown on FIGS. 8.1 and 8.2 to the Cache line which is generally represented by the reference character 266 at the bottom of FIG. 2.4.

If the instruction processed by the Logic Unit in FIG. 2.4 in an RS instruction, then it will appear on both cables 232 and 234 and wire 271 will be active in order to enable gate 240 through the OR circuit 246. It will be noted that gate 238 will also be enabled through OR circuit 244. Thus, information will appear on both cables 248 and 250 and travel to the Cache.

If the instruction processed by the Logic Unit is an SS instruction, then it will appear as a 96 bit format on all cables 232, 234 and 236, wire 273 will be active, enabling gates 242, 238 and 240 via OR circuits 244 and 246. The three gates 238, 240 and 242 will gate this information to cables 248, 250 and 252 which will convey the information to the Cache line.

One of the operating principles of the present embodiment is that the compiler does not allow an instruction to cross a Cache line boundary. This means that the last one or two half words in the Memory line at the right might be unused for instructions. The way that these are made to be unused is to insert an unconditional branch instruction before them in order to branch into an address in another Memory line. This means that when a branch instruction is encountered by the Logic Unit shown on FIG. 2.4 the remainder of the Memory line must be brought down into the Cache unchanged with the validity bit for each 16 bit section of the Memory line set to "zero". This 16 bit section of the Memory line which, when brought into the Cache, will be brought into the left-hand portion of the 32 bit section of the Cache line is the same information as was in the Memory line with the exception that the first left-hand bit of the 32 bit format contains the validity bit which is now set to "zero". Thus, as the transfer of instructions proceeds from the entering position of the Memory line to the right, as the Memory line is viewed in FIGS. 2.1 and 2.2, the instructions will be partially decoded and loaded into the Cache until an unconditional branch instruction is encountered. Thereafter, the remainder of the information in the Memory line will be brought into the Cache in 32 bit format each word of which will have its validity bit set to "zero" and this will continue until the remainder of the Memory line is brought into the Cache. It will be understood more in detail later how the "Memory Line Byte Counter" reaches its maximum count and then wraps around to all zeros and then proceeds to the position where the Memory line was originally entered. It will also be explained later, that if an access is made to the Cache for an instruction that has not been partially decoded, how this instruction will be partially decoded and instructions to the right of it that have not been partially decoded will be partially decoded and reentered into the Cache.

Reference to FIGS. 2.3 through 2.6 will show that, when an access is made to the Cache, at the starting address of the instruction, three groups of 32 bits each will be gated from the Cache to the Cache buffer 268 on FIG. 2.6. This gating is accomplished by a duplication of the gating shown in FIGS. 7.1 through 7.4 at the top of FIGS. 2.5 and 2.6 which gates these three groups of 32 bits each by cables 270, 272 and 274 to the Cache buffer 268. Three groups of 32 bits each are taken from the Cache each time and placed in the buffer 268 because it is possible that the instruction called for could be an SS instruction which is three half words long before it is partially decoded. In any event, the extreme left-hand bit in the Cache buffer 268 will be the validity bit. If the instruction is "valid", wire 288 will be active and if it is not "valid" wire 290 will be active. If wire 288 is active, gates 292, 294 and 296 will be enabled at C time through AND circuit 388. Also, if wire 288 is active, wires 298, 300 and 302 will indicate the number of half words in the instruction. For example, if it is an RR instruction, wire 298 will be active and will cause gate 304 to be enabled at C time. If the instruction is of the RS type, wire 300 will be active which will cause gate 306 to be enabled at C time (see FIG. 6) and if the instruction is an SS type instruction wire 302 will be active which will cause gate 308 to be active at C time. Thus, by enabling one of gates 304, 306 or 308, the partially decoded instruction is gated to the execution portion of the computer at C time.

If the "validity" bit is set to "zero", wire 290 will be active and will cause gate 310 to be enabled which will cause the original set of three half word instructions to be gated back to the Logic Unit, (shown in FIGS. 3.1 through 3.7 and FIG. 2.4). They will then be immediately partially decoded by the Logic Unit on FIG. 2.4 and gated to the proper place in the Cache after which the "Memory Line Byte Counter" will be advanced the proper amount. This process will continue to the right in the Cache line until either an instruction is encountered which has a "validity" bit which is set to "one" or, as described earlier, an unconditional branch instruction is encountered or if the next address is "zero". Then partial decoding ceases and the request for the instruction that started this latter sequence of events is again made and this time it will be successful because it will exist in the Cache line in a properly partially decoded form.

Reference should next be made to FIGS. 3.1 through 3.7 wherein the figure organization is indicated in FIG. 3. The upper portion of the composite figure illustrates the decoding that is necessary in order to partially decode an instruction. The bottom portion is largely devoted to gates which rearrange data into its various formats and the cables which go to the Cache.

The entry to the Logic Unit is via cables 224, 226 and 228. These bring in the information from the Memory line 200 on FIGS. 2.1 and 2.2. In this manner, three half words are brought into the Logic Unit because it is possible that any instruction could be three half words long. The actual length of the instruction is given by the first two bits in the operation code. These two bits are decoded by the decoder 318 and the output goes into bits 1, 2 and 3 of all formats shown in FIGS. 5.1 and 5.2. The operation code is decoded by the decoder 320 and the output of 320 is used to store information about frequently used instructions. For example, wire 322 becomes active if the instruction "subtract logical register" is encountered and wire 324 becomes active if the instruction "load and test register" is encountered. Wire 326 becomes active if a branch instruction is encountered. Wire 328 becomes active if the instruction involves a memory fetch and wire 330 becomes active if the instruction involves a store. The fetch bit is bit No. 27 in the 32 bit format on FIG. 5.2, the 43rd bit in the 64 bit format on FIG. 5.2 and the 59th bit in the 96 bit format on FIG. 5.2. The store bit is immediately after the fetch bit in each of these formats. There are four "category" bits in each of the formats shown on the figure and these are set by the output of the decoder 320 on FIG. 3.3 by the "local execute" lines, the E-box 1, box 2 or box 3 lines. In other words, it can be established by the partial decoding whether the instruction can be locally executed or must be executed in one of three possible execution boxes. The $R_1$ field is decoded by the decoder 332. In the case of a branch instruction the $R_1$ field contains the mask so it can be immediately established whether the branch is to be an unconditional branch or if the branch is not to be taken or if it is a conditional branch. In other words, if wire 334 is active it means that the branch is taken conditionally upon the condition of the condition code. If wire 336 is active, it means that the mask is equal to all ones and it should be taken unconditionally. If wire 338 is active it means that the mask contains all zeros and it should be unconditionally not taken. These three bits are stored in the Cache in the 32 bit format as bits 24, 25, and 26 and in the 64 bit format as bits 40, 41, and 42. In the 96 bit format as shown in FIGS. 5.1 and 5.2 these bits are shown as bits 56, 57 and 58.

On FIGS. 3.1 and 3.2, the $R_1$ and $R_2$ fields are compared by the compare unit 344. This compare unit 344 cooperates with the lines 322 and 324 exiting from the decode 320 and extending to the gates 340 and 342 to indicate whether the register denoted by $R_1$ is to be tested for "zero" or is to be set to "zero". These two bits are entered into the formats on FIGS. 5.1 and 5.2 as follows. In the 32 bit format they go into bit positions 30 and 29. In the 64 bit format they go into bit positions 46 and 45 and in the 96 bit format they go into bit positions 62 and 61.

Two base fields have to be considered. In the RS instruction there is only one base field but in the SS instruction there are two base fields. These two fields are decoded by the decoders 346 and 348 on FIGS. 3.1 and 3.2. The base field in the RS instruction goes into the 64 bit Cache format as bits 47 to 61. In the SS instruction, the left-hand base field, when decoded, goes into the 96 bit format as bits 63 to 77 and the right-hand base field goes in as bits 78 to 92.

Note that on FIG. 3.4, wire 326 extends to gate 350. The outputs of decoder 332 are only gated to the various Cache formats if the instruction is a branch as this is the only time that wire 326 can be active.

It is believed that the general flow of bits through the Logic Unit is apparent from studying FIGS. 3.1 through 3.7 and how this information exits on cables 232, 234 and 236. Reference to FIG. 2.4 will show that if the instruction is a half word instruction, the gate 238 will be enabled by the active state of wire 269 extending through the OR circuit 244. Under these conditions, an RR instruction will exit from the Logic Unit and travel via cable 248 through the gating network shown in FIGS. 8.1 and 8.2 to one of the cables 254–264, thus, filling a 32 bit section of the Cache line 266 on FIG. 2.4. If the instruction leaving the Logic Unit on FIG. 2.4 is a double half word instruction such as an RS instruction it will exit on both cables 232 and 234 because gates 238 and 240 will both be enabled by the active state of wire 271 which extends through OR circuits 244 and 246. These two cables 232 and 234 thus extend via cables 248 and 250 through the gating network of FIGS. 8.1 and 8.2 to a pair of cables such as 254–264 and will be entered into two sections of 32 bits each into the Cache line 266 on FIG. 2.4. If the instruction is three half words, it will exit on all three cables 232, 234 and 236 and, because wire 272 is active, all three gates 238, 240 and 242 will be enabled by the active state of this wire extending through OR circuits 244, 246 and directly to gate 242. Thus the three half words will exit on cables 248, 250 and 252 and will be entered into the Cache line through three consecutive cables such as 254–264 and they will thus take up a 96 bit position in the Cache line 266 on FIG. 2.4.

Reference should next be made to FIGS. 2.1 and 2.2. The present embodiment has two general modes of operation. The first can be called "load Cache" and the second can be called "interrogate Cache". In the first mode, the embodiment is concerned with loading the Cache from a Memory line of 128 bytes. In the second mode, the embodiment is concerned with interrogating the Cache for an instruction that has been previously partially decoded. If the instruction it finds has not been partially decoded the operation continues to partially decode it and all following instructions to the right until an instruction is found that has been partially decoded or an unconditional branch is encountered or until the next address is zero. If, when interrogating the Cache, the instruction has been found to be partially decoded it is immediately shipped off to the execution unit and no further action results.

The operation "load Cache" starts with a signal on wire 350. This signal sets flip-flop 352 to its "one" state and extends through OR circuit 354 to set flip-flop 356 to its "one" state. As shown on FIG. 6, this signal occurs at A clock time, also shown on the timing diagram at the top of FIG. 2.1. Because flip-flop 352 is in its "one" state, wire 360 will be active. The active state of wire 360 enables gate 364. Gate 364 will gate the setting of the "Memory Line Byte Counter" and decoder (FIG. 4) to the gating shown in FIGS. 7.1 through 7.4 at the output of the Memory line 200. Before the time that the "load Cache" signal occurs on wire 350 as shown on FIG. 6, the low order seven bits of the address appear on cable 366 and are entered in register 368. Cable 366 also goes to the "Memory Line Byte Counter" through gate 434 and this low order seven bits are entered into it. Gate 434 is enabled through OR circuit 354. Thus, the address can be any point in the memory line. When the signal appears on wire 350, wire 370 becomes active. Wire 370 extends to the Logic Unit on FIG. 2.4 and the signal on it is used to set the validity bit 424 to its "one" state.

In the "load Cache" mode, the embodiment takes three half words from the Memory line and applies them to the logic unit on FIG. 2.4. Thus, if the instruction happens to be three half words long, it is immediately predecoded and placed in the three sections of the Cache line 266. If the instruction is only two half words long then only two half words are taken and placed into two sections of the Cache line and if the instruction is only one half word long only a single half word is gated through to the section in the Cache line. After the instruction which has been partially decoded is placed in the Cache line the "Memory Line Byte Counter" is incremented, as shown in FIG. 4. Thus the "Memory Line Byte Counter" is incremented by "two" or by "four" or by "six" depending on the length of the instruction. If, for example, only the information coming in on cable 224 on FIG. 2.4 happened to be used by the Logic Unit because the instruction was only a half word instruction, the information on cables 226 and 228 would be rewritten for the next cycle. In other words the information 226 in the next cycle would appear on cable 224 and the information on cable 228 would appear on cable 226 in the next cycle.

Loading of the Cache line 266 with partially decoded instructions continues until an unconditional branch instruction is encountered or the next address is zero. An instruction is never allowed to extend beyond a Cache line boundary. When this unconditional branch instruction is encountered, wires 326 and 336 will become active and will extend through AND circuit 378 on FIG. 2.4. This active state will extend along wire 376, OR circuit 438, AND circuit 436 and will result in setting the validity bit in flip-flop 424 in the Logic Unit, to its "zero" state at C time in the cycle. Note that when the incremented "Memory Line Byte Counter" is on "0" that the active state of wire 127 in FIG. 4 will extend through OR circuit 438 to accomplish the same purpose.

On FIG. 2.2 when flip-flop 356 is set to its "one" state, wire 384 becomes active. Wire 384 extends to FIG. 2.5 where it causes flip-flop 386 to be placed in its "zero" state. When flip-flop 386 is in its "zero" state AND circuit 388 is enabled and permits an active state of wire 288 to enable AND circuits 292, 294 and 296 at C time.

Note that in the case of the "load Cache" operation the operation is not terminated by the active state of wire 376. This cannot happen because the "Memory Line Byte Counter" must wrap around until the entire Memory line is transferred to the Cache. The only difference is that after the pulse appears on line 440, the information on the Memory line is transferred one half word at a time with the validity bit in each section set to its "zero" state. In other words, when the machine is in the "load Cache" mode, the active state of the wire 376 merely sets the validity bit in the Logic Unit to its "zero" state. It will later be explained how, when the machine is in the "interrogate Cache" state, that the pulse on wire 376 is allowed to extend through AND circuit 390 and through OR circuit 442, also through the AND circuit 382 to set flip-flop 356 to its "zero" state, thus terminating an "interrogate Cache" operation.

On a "load Cache" operation it will be noted that flip-flop 352 is in its "one" state and therefore AND circuit 390 will not be enabled and therefore the pulse on wire 376 cannot get through to turn off flip-flop 356 or, in other words, to set it to its "zero" state. Thus, after an unconditional branch instruction is encountered when the machine is in the "load Cache" mode, the machine will continue placing data from the Memory line into the Cache line. However, it is not known whether this data that is placed into the Cache line after the branch instruction is encountered, or when the next address is zero, is data or instructions so each section of the Memory line which consists of one half word is placed into a section of the memory Cache with a validity bit in front of it set to a "zero". In other words, each 16 bit portion of the Memory line which constitutes a half word is placed into the Cache line in a 32 bit section with a left-hand validity bit which is set to "zero". This action will continue until the incremented "Memory Line Byte Counter" which appears on cable 392, FIG. 2.1, compares with the initial value loaded in the register 368. When this happens, wire 394 will become active and this active state will extend through OR circuits 380 and 442 and through AND circuit 382 at C time, to set flip-flop 356 to its "zero" state thus terminating operations.

To interrogate the Cache for an instruction, a signal appears on wire 396, FIG. 2.2. This signal extends through OR circuit 354 to set flip-flop 356 to its "one" state. The low order seven bits of the address also appear on cable 366 and are entered into register 368 and also go via cable 366 to set the "Memory Line Byte Counter". As will be understood later, register 368 is not used in the "interrogate" mode. With flip-flop 352 in its "zero" state and flip-flop 356 in its "one" state, AND circuit 398 will be enabled in order to produce an output on wire 400. The active state of wire 400 enables AND circuit 402 whenever the B clock pulse occurs to enable gate 404 which connects the output of the "Memory Line Byte Counter" and decoder to the cables such as 276–286 on FIGS. 2.5 and 2.6. On FIG. 2.5 it should be note that flip-flop 386 is in its "zero" state because of the pulse on wire 384. In other words, AND circuit 388 on FIG. 2.5 is always enabled by the "zero" side of flip-flop 386 at the start of an "interrogate" operation.

The first three half words pointed to by the seven low order bits will be read out of the Cache line on FIGS. 2.3 and 2.4 and placed in the Cache buffer 268. The left-hand bits will be immediately decoded and, if the entry in the Cache buffer is valid, wire 288 on FIG. 2.5 will become active and this active state will extend through AND circuit 388 at C time, to enable AND circuits 292, 294 and 296. Thus, depending on the length of the instruction, whether it is a half word, two half words or three half words instruction, one of these gates will be enabled to enable one of gates 304, 306, 308 on FIG. 2.5 to gate the desired partially decoded instruction to the execution unit of the computer or Processor. If the validity bit is "zero", a pulse will appear on wire 290 which sets flip-flop 386 on FIG. 2.5 to its "one" state at B time and thus disables AND circuit 388. This will prevent the instruction being gated to the execution unit and instead, provide a circuit to enable gate 310 at the lower right of FIG. 2.6 in order to gate the three half words from the Cache buffer through the Logic Unit and back to the Cache line at the bottom of FIGS. 2.3 and 2.4.

The "interrogate Cache" operation then continues until either an unconditional branch instruction, is encountered in the Cache buffer, or where the entry into the Cache buffer indicates that its validity bit is "one", or that the next address is "zero".

The 127 wire from FIG. 4 extends to OR circuit 442 on FIG. 2.2. The output of OR circuit 442 extends through AND circuit 382 at C time, to set flip-flop 356 to its "zero" state and thus terminate operations.

Flip-flop 386 on FIG. 2.5, when in its "zero" state, enables AND circuit 388 and thus permits the gating of a valid, partially predecoded instruction from the Cache buffer 368 to the execution portion of the processor. However, it is only desired to gate an instruction to the execution portion of the processor if its validity bit is set to "one" which indicates that it has been partially decoded and also, it is only desired to gate this instruction to the execution portion of the processor if it is the first instruction encountered on an "interrogate Cache" operation, for example, if an "interrogate Cache" operation occurs and if the first instruction extracted from the Cache has its validity bit set to "one", the instruction will be shipped off to the execution portion of the processor and that is the end of the "interrogate Cache" operation.

If, on the other hand, an "interrogate Cache" operation finds the first instruction with a "zero" validity bit, this instruction will not be sent to the execution portion of the computer but will, instead, be recirculated through the Logic Unit, partially decoded and placed back in the Cache. The "interrogate Cache" operation will continue, partially decoding succeeding instructions that exist in the Cache that have their validity bits set to "zero" until either an unconditional branch instruction is encountered, the next address is zero or until an instruction is encountered that has its validity bit set to "one", which means that the instruction was partially decoded on a previous operation which would have been either a "Load Cache" operation or an "interrogate Cache" operation. Obviously, if a later instruction is encountered on an "interrogate Cache" operation, it should not be sent to the execution portion of the computer, since it is not the instruction asked for. The flip-flop 386 on FIG. 2.5 prevents this happening. The first time that a "zero" validity bit is encountered, flip-flop 386 is set to its "one" state which disables AND circuit 388.

The validity bit flip-flop is shown as 424 in FIG. 3.3. When it is in its "one" state, wire 426 is active and when it is in its "zero" state, wire 428 is active. The active state of wire 426 is used to enable gate 430 which allows one of wires 269, 271 and 273 to enable one of three gates on FIG. 3.5. If wire 428 is active, it enables gate 277 near the bottom left corner of FIG. 3.5.

The arrangement of gates and cables on FIG. 3.5 is believed to be self-explanatory. It is also believed that there could be other arrangements of gates and cables that would accomplish the same purpose.

On FIG. 3.3, the wires 269, 271 and 273 which are used to increment the "Memory Line Byte Counter" on FIG. 2.1 are effective only if gate 430 is enabled by wire 426 which comes from the "one" side of the validity bit flip-flop 424. When the validity bit flip-flop is in its "zero" state, wire 428 is active and its active state extends through OR circuit 432 on FIG. 2.3 in order to make it possible to increment the "Memory Line Byte Counter" when the validity bit flip-flop is in its "zero" state.

The "Memory Line Byte Counter and Decoder" shown in detail in FIG. 4 will now be described briefly.

On FIG. 4, the counter is loaded at the start of a "Load Cache" or "interrogate Cache" operation with the low order seven bits of the address. It should be noted that, at the start of any operation, flip-flop 446 (FIG. 2.4) is in its "zero" state and therefore wire 448 is inactive. The A clock pulse, therefore, on FIG. 4, which is applied to AND circuit 450 is ineffective and cannot enable gate 452. However, at B time in the first cycle, flip-flop 446 will be set to "one" by the B pulse through AND circuit 454. On succeeding cycles, the A pulse applied to AND circuit 450 (FIG. 4) will be effective to update the counter with the incremented value.

On FIG. 2.1 OR circuit 456 has two inputs, wires 290 and 400. Wire 290 is active, if on an "interrogate Cache" operation, the validity bit is "zero". Wire 400 is active only on an "interrogate Cache" operation when flip-flop 352 is on "zero" and flip-flop 356 is on "one" which conditions enable AND circuit 398 on FIG. 2.2. If, on an "interrogate Cache" operation, the validity bit turns out to be "zero", it means that the instruction must be recycled through the Logic Unit and returned to the Cache line. The output of AND circuit 456 provides an input to OR circuit 458 which has an output to AND circuit 460 so that, at C time, gate 462 is enabled to transmit the value in the "Memory Line Byte Counter" through its decoder to the gating circuitry indicated on FIGS. 2.3 and 2.4 by reference to FIGS. 8.1 and 8.2. The intervening AND circuit 461 and flip-flop 463 ensure that gate 460 remains enabled for the full duration of the C pulse. In this manner, the instruction along with its partially decoded information gets gated into the Cache lines.

An "interrogate Cache" operation starts with a pulse on wire 396 (FIG. 2.2). This goes through OR circuit 354 to set flip-flop 356 to its "one" state. The active state of wire 396 extends along wire 384 to FIG. 2.5 where it sets flip-flop 386 to "zero". Because flip-flop 352 is in its "zero" state and flip-flop 356 is in its "one" state, AND circuit 398 will be enabled and have an output on wire 400. Wire 400 also extends to FIG. 2.5 where it enables AND circuit 472. If the first access to the Cache finds a validity bit="zero", wire 290 will become active and, at B time, AND circuit 472 will have an output to set flip-flop 386 to its "one" state. This will cause wire 470 to become active. Because the first access to the Cache did not find a valid, partially decoded instruction, the "interrogate Cache" operation must continue until it is terminated by encountering a validity bit="one", the next address is "zero" or an unconditional branch. Wire 470 will remain active and when the C pulse through AND circuit 382 turns flip-flop 356 to "zero", this same pulse will extend through AND circuit 474 to wire 468 and thus provide a signal to re-interrogate the Cache.

The three conditions that terminate the "interrogate Cache" are as follows.

When a "one" validity bit is encountered wire 288 becomes active. This active state extends through OR circuit 380 FIG. 2.2 and, at C time, through OR circuit 442 and AND circuit 382 is effective to set flip-flop 356 to "zero". When the "next address is zero" a pulse appears on wire 127 and extends through OR circuit 442 to return off flip-flop 356 at C time. When an unconditional branch is encountered, wire 376 becomes active. This active state extends through AND circuit 390 because flip-flop 352 is in its "zero" state, through OR circuit 442 and AND circuit 382 at C time to set flip-flop 356 to its "0" state.

Having thus completed the description of the preferred embodiment of the present invention as shown in FIGS. 1 through 8, it will be apparent to those skilled in the art that many modifications can be made to such a system without departing from the spirit and scope of the invention as herein disclosed. The actual control hardware as shown could also take the form of a small microprocessor and a Read Only Memory for performing the various control operations necessary to predecode the instructions. Also, as stated previously, many other types of instructions than those disclosed could be partially decoded and also other fields of the instructions illustrated herein could be further decoded.

Also, as stated previously, the concepts of the present invention could equally well be applied to a single Cache architecture by providing appropriate decoding and switching means whereby only instructions would pass through the decoder.

It should also be noted in passing that the present embodiment is directed solely towards the decoding of instructions being transferred from Memory to the Cache and subsequently to the Processor. It should, of course, be understood that if the instructions were to be modified and returned to the Memory, control means would have to be provided to return them to their compacted form before their being returned to the backup Memory. This, of course, is due to the fact that the original Memory storage locations would not be capable of storing the instruction in extended form. However, it is believed that the need for such a feature would be clearly apparent to those skilled in the art, it being noted that only a relatively small number of instructions are ever altered in return to Memory.

INDUSTRIAL APPLICABILITY

The present invention has particular utility in the field of large electronic computing systems. It is more particularly adapted to enhance the operation of such computers having at least two levels of Memory wherein at least one level comprises a high-speed relatively low capacity Cache Memory. The use of the present invention will speed up the effective instruction execution time of the system since each instruction will theoretically only have to be decoded once as it is transferred from the backup Memory to the Cache. Such a decrease in the instruction execution time will result in a greater system throughput with a minimal hardware investment and thus decrease the cost/performance ratio. Since minimizing this ratio is a primary criteria for virtually all system design, the present invention will materially enhance the value or salability of any system incorporating same.

Having thus described our invention, what we claim as new, and desire to secure by Letters Patent is:

1. An information processing system including a central processor and a hierarchical memory system comprising:
   at least one low speed, high capacity main memory having a relatively long access time and having a plurality of data pages stored therein,
   at least one high speed, low capacity Cache memory means having a relatively short access time and adapted to store a predetermined plurality of subsets of the information stored in said main memory data pages, and
   memory accessing control means for accessing data stored in said hierarchical memory system,
   instruction decoding means located in a communication channel disposed between the main Memory and Cache memory for transferring data between said memories and operative in conjunction with the memory access controls to at least partially decode instructions being transferred from Memory to Cache, and
   means for storing said instructions in the Cache in at least partially decoded form.

2. An information processing system as set forth in claim 1 wherein said at least partial decoding means includes means for expanding the instruction format to be utilized when storing instructions in said cache memory from that utilized in main Memory storage to one more readily executable directly by the processor prior to storing said instructions in the Cache, said decoding means further including,
   logic circuit means for determining whether a given instruction in susceptible of partial decoding, and
   means for determining that a particular instruction has already been partially decoded.

3. An information processing system as set forth in claim 2 wherein said Cache memory is partitioned to provide separate storage means for data and instructions respectively and means for determining that an instruction is being transferred from Memory to Cache operative to cause said instruction to pass through said decoding means.

4. An information processing system as set forth in claim 3 wherein the means for determining if a particular instruction has already been decoded includes means for setting and detecting a predetermined bit field in the Cache memory related to the assigned storage location in the Cache for that instruction.

5. An information processing system including a central processor and a hierarchical memory system comprising:
   at least one low speed, high capacity main memory having a relatively long access time and having a plurality of data pages stored therein,
   at least one high speed, low capacity Cache memory means having a relatively short access time and adapted to store a predetermined plurality of subsets of the information stored in said main memory data pages,
   memory accessing control means for accessing data stored in said hierarchical memory system, and
   a communication channel for transferring data between said chain and cache memories, said Cache memory being partitioned to provide distinct sections for storing data and instructions respectively, said Cache memory including control means for routing data and instructions to the proper section thereof, instruction decoding means located in the communication channel connecting the main Memory and the instruction section of the Cache memory operative in conjunction with the memory access control means to at least partially decode instructions being transferred from the main Memory to Cache, means for determining that an instruction is from main Memory to Cache, means for determining that an instruction is being transferred from main Memory to Cache operative to cause said instruction to pass through said decoding means, said at least partial decoding means including means for expanding the instruction format to be utilized when storing instructions in said cache memory from that utilized in main Memory to a format more readily executable directly by the processor prior to storing said instructions in the Cache, said decoding means further including means for determining whether selected portions of a given instruction are susceptible of partial decoding, and means for determining that a particular instruction has already been partially decoded.

6. An information processing system including a central processor and a hierarchical memory system comprising:

at least one low speed, high capacity main memory having a relatively long access time and having a plurality of data pages stored therein, at least one high speed, low capacity Cache memory means having a relatively short access time and adapted to store a predetermined plurality of subsets of the information stored in said main memory data pages, and memory control means for accessing data stored in said hierarchical memory system, instruction decoding means located in a communication channel disposed between the main Memory and Cache memory for transferring data between said memories and operative in conjunction with the memory access controls for at least partially decoding instructions being transferred from Memory to Cache further including;

means for expanding the instruction format to be utilized when storing instructions in cache memory from that utilized in main Memory storage to a format more readily executable by the processor prior to storing said instructions in the Cache, said decoding means further including logic circuit means for detecting that a given instruction is susceptible of partial decoding, means for specifying that a particular instruction stored in cache memory has already been partially decoded, and means for storing instructions in Cache in at least partially decoded form.

7. An information processing system as set forth in claim 6 wherein said decoding means includes means for selectively rearranging predetermined fields of certain instructions prior to their being stored in said Cache.

8. An information processing system as set forth in claim 6 wherein the means for determining if a particular instruction has already been decoded includes means for setting and interrogating a predetermined bit field in the Cache memory related to the assigned storage location in the Cache for that instruction.

9. A hierarchical memory system comprising at least one low speed, high capacity main memory having a relatively long access time and having a plurality of data pages stored therein and at least one high speed, low capacity Cache memory means having a relatively short access time and adapted to store a predetermined plurality of subsets of the information stored in said main memory data pages, said Cache memory being partitioned to provide distinct sections for storing data and instructions respectively, said Cache memory including:

control means operable in conjunction with an attached processor for routing data and instructions to the proper section thereof, instruction decoding means located in a communication channel connecting the main Memory and the instruction section of the Cache memory operative to at least partially decode instructions being transferred from the main Memory to Cache, means for determining that an instruction is being transferred from main Memory to Cache operative to cause said instruction to pass through said decoding means, said at least partial decoding means including means for expanding the instruction format from a compacted form utilized in main Memory to a format more readily executable directly by a processor unit prior to storing said instructions in the Cache, said decoding means further including means for determining whether selected portions of a given instruction are susceptible of partial decoding, and means for detecting that a particular instruction stored in the Cache has already been partially decoded, said means for detecting including logic means for interrogating a predetermined portion of the storage area assigned to each instruction word stored therein for a unique "decoded" bit pattern.

10. A method for processing instructions in an information processing system including a central processing unit and a hierarchical memory system comprising at least one low speed, high capacity main memory having a relatively long access time and having a plurality of data pages stored therein and at least one high speed, low capacity Cache memory means having a relatively short access time and adapted to store a predetermined plurality of subsets of the information stored in said main memory, said central processing unit including means for controlling the transfer of data between the main memory and the cache memory and the cache memory and the central processing unit, said method including the steps of:

determining whether data being transferred from main memory to the Cache is an instruction, at least partially decoding predetermined instructions before they are stored in the cache memory, storing a portion of a long instruction string in Cache in undecoded form when it is not possible to partially decode the entire string during a predetermined transfer operation and, subsequently partially decoding the portion of said string which was not previously partially decoded before it is transferred to the central processing unit from the cache memory.

11. A method as set forth in claim 10 including testing every instruction stored in Cache for partial decoding prior to transfer of said instruction to the central processing unit.

* * * * *